United States Patent
Zhao et al.

(10) Patent No.: US 12,302,377 B2
(45) Date of Patent: May 13, 2025

(54) DATA TRANSMISSION METHOD AND DEVICE

(71) Applicant: DATANG MOBILE COMMUNICATIONS EQUIPMENT CO., LTD., Beijing (CN)

(72) Inventors: Yali Zhao, Beijing (CN); Da Wang, Beijing (CN)

(73) Assignee: Datang Mobile Communications Equipment Co., Ltd., Beijing (CN)

( * ) Notice: Subject to any disclaimer, the term of this patent is extended or adjusted under 35 U.S.C. 154(b) by 673 days.

(21) Appl. No.: 17/614,785

(22) PCT Filed: Jan. 10, 2020

(86) PCT No.: PCT/CN2020/071548
§ 371 (c)(1),
(2) Date: Nov. 29, 2021

(87) PCT Pub. No.: WO2020/244241
PCT Pub. Date: Dec. 10, 2020

(65) Prior Publication Data
US 2022/0174688 A1    Jun. 2, 2022

(30) Foreign Application Priority Data
Jun. 6, 2019  (CN) .......................... 201910493317.6

(51) Int. Cl.
*H04W 72/02*        (2009.01)
*H04W 72/1263*    (2023.01)
(Continued)

(52) U.S. Cl.
CPC ..... *H04W 72/569* (2023.01); *H04W 72/1263* (2013.01); *H04W 72/20* (2023.01); *H04W 92/18* (2013.01)

(58) Field of Classification Search
CPC .......... H04W 72/569; H04W 72/1263; H04W 72/20; H04W 92/18; H04W 28/086;
(Continued)

(56) References Cited

U.S. PATENT DOCUMENTS 10,070,438 B2    9/2018  Fu et al.
10,405,327 B2    9/2019  Loehr et al.
(Continued)

FOREIGN PATENT DOCUMENTS

CN    102083138 A    6/2011
CN    105141398 A    12/2015
(Continued)

OTHER PUBLICATIONS

3GPP TSG-RAN WG2 Meeting #105, "Further QoS considerations for NR V2X", R2-1900885, Athens, Greece, Feb. 25-Mar. 1, 2019.
(Continued)

*Primary Examiner* — Pamit Kaur
(74) *Attorney, Agent, or Firm* — Meunier Carlin & Curfman LLC

(57) ABSTRACT

A data transmission method and device are disclosed. The data transmission method includes: when a terminal that does not support transmission of data at a first interface and a second interface simultaneously has data transmission requirements simultaneously at the first interface and the second interface, respectively determining highest priority data of each of the first and second interfaces; the terminal compares a priority of the highest priority data of the first interface with a priority of the highest-priority data of the second interface and determines an interface corresponding to higher priority data; and the terminal sends data through the determined interface.

19 Claims, 5 Drawing Sheets

(51) Int. Cl.
  *H04W 72/20* (2023.01)
  *H04W 72/566* (2023.01)
  *H04W 92/18* (2009.01)

(58) Field of Classification Search
  CPC ......... H04W 28/0205; H04W 28/0278; H04W 48/18; H04W 24/04; H04W 72/21; H04W 88/06; H04W 92/10
  See application file for complete search history.

(56) References Cited

U.S. PATENT DOCUMENTS

| | | | |
|---|---|---|---|
| 10,779,242 B2 | 9/2020 | Wang et al. | |
| 10,779,308 B2 | 9/2020 | Patil et al. | |
| 2020/0045724 A1* | 2/2020 | Lu | H04W 72/569 |
| 2020/0245188 A1* | 7/2020 | Zhang | H04W 72/569 |
| 2021/0352700 A1* | 11/2021 | Lohr | H04W 28/0278 |

FOREIGN PATENT DOCUMENTS

| | | |
|---|---|---|
| CN | 107079530 A | 8/2017 |
| CN | 107889157 A | 4/2018 |
| CN | 109478991 A | 3/2019 |
| WO | 2018062969 A1 | 4/2018 |
| WO | 2018082571 A1 | 5/2018 |

OTHER PUBLICATIONS

3GPP TSG-RAN WG2 Meeting #106, Relative QoS handling between NR SL and NR Uu, R2-1907456, Reno, USA May 13-17, 2019.
3GPP TS 36.321, 3rd Generation Partnership Project; Technical Specification Group Radio Access Network; Evolved Universal Terrestrial Radio Access (E-UTRA); Medium Access Control (MAC) protocol specification (Release 15), Mar. 2019.
3rd Generation Partnership Project, TS 24.386 V15.1.0, 2018, pp. 1-35.

* cited by examiner

DATA TRANSMISSION METHOD AND DEVICE

CROSS-REFERENCE OF RELATED APPLICATIONS

This application is a US National Stage of International Application No. PCT/CN2020/071548, filed Jan. 10, 2020, which claims priority to Chinese Patent Application No. 201910493317.6, filed with the China National Intellectual Property Administration on Jun. 6, 2019 and entitled "Data Communication Method and Device", which is hereby incorporated by reference in its entirety.

FIELD

The present application relates to the field of wireless communication technologies and particularly to a data communication method and device.

BACKGROUND

At present, a terminal may use the cellular network interface (Uu interface) for data communication, and may also use the direct communication interface (Sidelink interface) for data communication.

However, the behavior of the terminal is unclear when the terminal needs to send data on both the cellular network interface (Uu interface) and the direct communication interface (Sidelink interface).

SUMMARY

The present application provides a data communication method and device, to solve the problem of data communication conflict produced when a terminal that does not support data communication simultaneously at the direct communication interface and the Uu interface has data communication requirements simultaneously at the direct communication interface and the Uu interface in the related art.

In a first aspect, an embodiment of the present application provides a data communication method, including: determining, by a terminal that does not support data communication simultaneously at first and second interfaces, highest-priority data of each of the first and second interfaces respectively when the terminal has data communication requirements simultaneously at the first and second interfaces; comparing, by the terminal, a priority of the highest-priority data of the first interface with a priority of the highest-priority data of the second interface to determine an interface corresponding to higher-priority data; sending, by the terminal, data through the determined interface.

In the above solution, when the terminal that does not support data communication simultaneously at first and second interfaces has data communication requirements simultaneously at the first and second interfaces, the terminal compares the priority of the highest-priority data of the first interface with the priority of the highest-priority data of the second interface to determine the higher-priority data and further determine the interface corresponding to the higher-priority data, and sends data through the determined interface and performs data communication through the interface corresponding to the higher-priority data, avoiding the data communication conflict when there are data communication requirements simultaneously at the first and second interfaces.

In a possible implementation, if the highest-priority data of the first interface and the highest-priority data of the second interface are different types of data, when the terminal compares the priority of the highest-priority data of the first interface with the priority of the highest-priority data of the second interface to determine the interface corresponding to higher-priority data: the terminal determines the interface corresponding to higher-priority data in a following priority order; where the priority order is: a priority of data from common control channel and/or MAC CE (Medium Access Control Control Element) for carrying important control information is higher than a priority of data from logical channels other than the common control channel and/or physical layer control information; the priority of data from logical channels other than the common control channel and/or physical layer control information is higher than a priority of MAC CE for carrying unimportant control information.

In the above solution, when the highest-priority data of the first interface and the highest-priority data of the second interface are different types of data, the comparison is performed in the set priority order when the priority comparison is performed for the highest-priority data of the first interface and the highest-priority data of the second interface, to determine the higher-priority data and further determine the interface corresponding to the higher-priority data, so that the terminal preferentially transmits data on the interface corresponding to the higher-priority data.

In a possible implementation, if the highest-priority data of the first interface and the highest-priority data of the second interface are same type of data, when the terminal compares the priority of the highest-priority data of the first interface with the priority of the highest-priority data of the second interface to determine the interface corresponding to higher-priority data: the terminal determines the interface corresponding to higher-priority data according to one of network configuration, protocol stipulation, pre-configuration or randomization when the highest-priority data of each of the first and second interfaces determined respectively are both data from common control channel and/or MAC CE for carrying important control information; or the terminal determines the interface corresponding to higher-priority data according to one of network configuration, protocol stipulation, pre-configuration or randomization when the highest-priority data of each of the first and second interfaces determined respectively are both MAC CE for carrying unimportant control information; or the terminal compares a priority parameter of a highest-priority logical channel of the first interface with a priority parameter of a highest-priority logical channel of the second interface to determine the interface corresponding to higher-priority data when the highest-priority data of each of the first and second interfaces determined respectively are both data from logical channels other than the common control channel and/or physical layer control information.

In the above solution, when the high-priority data of the first interface and the high-priority data of the second interface are the same type of data and when the high-priority data of the first interface is compared with the high-priority data of the second interface, different rules are set for different types of data, and the priority comparison is performed on the determined data according to the set rules to determine the interface corresponding to the higher-priority data, so that the terminal preferentially transmits data on the interface corresponding to the higher-priority data.

In a possible implementation, the MAC CE for carrying important control information includes some or all of: C-RNTI (Cell Radio Network Temporary Identity) MAC CE; Configured Grant Confirmation MAC CE (Configured Grant Confirmation Medium Access Control Control Element); BSR (Buffer Status Report) MAC CE other than Padding BSR MAC CE; PHR (Power Headroom Report) MAC CE, including but not limited to: Single Entry PHR MAC CE (Single Entry Power Headroom Report Medium Access Control Control Element) or Multiple Entry PHR MAC CE (Multiple Entry Power Headroom Report Medium Access Control Control Element).

In a possible implementation, the MAC CE for carrying unimportant control information includes some or all of: Recommended bit rate query MAC CE (Medium Access Control Control Element for Recommended bit rate query); Padding BSR MAC CE (Medium Access Control Control Element for Padding Buffer Status Report); Sidelink BSR MAC CE (Medium Access Control Control Element for Sidelink Buffer Status Report).

The above solution specifically gives which data may be the highest-priority data of the first interface and the highest-priority data of the second interface when the highest-priority data of the first interface and the highest-priority data of the second interface are MAC CEs for carrying important control information, and simultaneously gives which data may be the highest-priority data of the first interface and the highest-priority data of the second interface when the highest-priority data of the first interface and the highest-priority data of the second interface are MAC CEs for carrying unimportant control information.

In a possible implementation, when the highest-priority data is physical layer control information, the highest-priority logical channel is one of: the highest-priority logical channel is a logical channel triggering an SR (Scheduling Request) when the physical layer control information is the SR; the highest-priority logical channel is a highest-priority logical channel contained in a TB (Transport Block) corresponding to an HARQ (Hybrid Automatic Repeat reQuest) feedback when the physical layer control information is the HARQ feedback; the highest-priority logical channel is a highest-priority logical channel on which the terminal currently has data to be sent when the physical layer control information is CSI (Channel State Information).

In the above solution, when the highest-priority data of the first interface and/or the highest-priority data of the second interface is/are the physical layer control information, different physical layer control information corresponds to different highest-priority logical channels, and the above solution clearly gives the highest-priority logical channel corresponding to the physical layer control information.

In a possible implementation, the priority parameter of the logical channel includes some or all of: a priority level in a QoS (Quality of Service) parameter; a priority parameter in RLC (Radio Link Control) channel configuration information.

The above solution specifically gives which parameters are included in the priority parameters of the logical channel.

In a possible implementation, when the terminal compares the priority parameter of the highest-priority logical channel of the first interface with the priority parameter of the highest-priority logical channel of the second interface to determine the interface corresponding to higher-priority data: mapping the priority parameter of the highest-priority logical channel of the first interface to a priority parameter of a logical channel of the second interface, and comparing the priority parameter of the highest-priority logical channel of the first interface with the priority parameter of the highest-priority logical channel of the second interface to determine the interface corresponding to higher-priority data; or mapping the priority parameter of the highest-priority logical channel of the second interface to a priority parameter of a logical channel of the first interface, and comparing the priority parameter of the highest-priority logical channel of the first interface with the priority parameter of the highest-priority logical channel of the second interface to determine the interface corresponding to higher-priority data; or comparing the priority parameter of the highest-priority logical channel of the first interface with a first preset threshold, and determining the interface corresponding to higher-priority data to be the first interface when a value of the priority parameter is lower than the first preset threshold; or comparing the priority parameter of the highest-priority logical channel of the second interface with a second preset threshold, and determining the interface corresponding to higher-priority data to be the second interface when a value of the priority parameter is lower than the second preset threshold; or comparing the priority parameter of the highest-priority logical channel of the first interface directly with the priority parameter of the highest-priority logical channel of the second interface to determine the interface corresponding to higher-priority data.

The above solution provides a plurality of solutions for comparing the priority parameter of the highest-priority logical channel of the first interface with the priority parameter of the highest-priority logical channel of the second interface to determine the interface corresponding to the higher-priority data, to thereby accurately determine the interface corresponding to the higher-priority data, so that the data is transmitted preferentially through the interface corresponding to the higher-priority data.

In a possible implementation, the priority parameter of the logical channel is a priority parameter in RLC channel configuration information; when mapping the priority parameter of the highest-priority logical channel of the second interface to the priority parameter of the logical channel of the first interface: the terminal receives a priority parameter of the first interface in RLC channel configuration information corresponding to the highest-priority logical channel of the second interface configured by a network side device, and uses the priority parameter of the first interface as the mapped priority parameter of the highest-priority logical channel of the second interface; or when mapping the priority parameter of the highest-priority logical channel of the first interface to the priority parameter of the logical channel of the second interface: the terminal receives a priority parameter of the second interface in RLC channel configuration information corresponding to the highest-priority logical channel of the first interface configured by the network side device, and uses the priority parameter of the second interface as the mapped priority parameter of the highest-priority logical channel of the first interface.

In a possible implementation, the priority parameter of the logical channel is a priority level in a QoS parameter; when mapping the priority parameter of the highest-priority logical channel of the second interface to the priority parameter of the logical channel of the first interface: the terminal receives a priority level in a QoS parameter of the first interface in RLC channel configuration information corresponding to the highest-priority logical channel of the second interface configured by a network side device, and uses the priority level in the QoS parameter of the first interface as the mapped priority parameter of the highest-priority logical channel of the second interface; or when mapping the priority parameter of the highest-priority logical channel of the first interface to the priority parameter of the logical channel of the second interface: the terminal receives a priority level in a QoS parameter of the second interface in RLC channel configuration information corresponding to the highest-priority logical channel of the first interface configured by a network side device, and uses the priority level in the QoS parameter of the second interface as the mapped priority parameter of the highest-priority logical channel of the first interface.

In the above solution, when the priority comparison is performed to determine the interface corresponding to the higher-priority data after the priority parameter of the highest-priority logical channel of the second interface is mapped to the priority parameter of the logical channel of the first interface, and when the priority parameter of the logical channel is the priority parameter in the RLC channel configuration information and/or the priority parameter of the logical channel is the priority level in the QoS parameter, the terminal device compares the mapped priority parameter of the first interface sent by the network side device with the priority parameter of the highest-priority logical channel of the first interface to determine the interface corresponding to the higher-priority parameter, where the mapped priority parameter of the first interface is the priority parameter of the first interface obtained after the network side device maps the priority parameter of the highest-priority logical channel of the second interface, and the mapped priority parameter of the first interface is returned to the terminal as the priority parameter of the highest-priority logical channel of the second interface; or when the priority comparison is performed to determine the interface corresponding to the higher-priority data after the priority parameter of the highest-priority logical channel of the first interface is mapped to the priority parameter of the logical channel of the second interface, and when the priority parameter of the logical channel is the priority parameter in the RLC channel configuration information and/or the priority parameter of the logical channel is the priority level in the QoS parameter, the terminal device compares the mapped priority parameter of the second interface sent by the network side device with the priority parameter of the highest-priority logical channel of the second interface to determine the interface corresponding to the higher-priority parameter, where the mapped priority parameter of the second interface is the priority parameter of the second interface obtained after the network side device maps the priority parameter of the highest-priority logical channel of the first interface, and the mapped priority parameter of the second interface is returned to the terminal as the priority parameter of the highest-priority logical channel of the first interface.

In a possible implementation, when mapping the priority parameter of the highest-priority logical channel of the second interface to the priority parameter of the logical channel of the first interface: the terminal maps the priority parameter of the highest-priority logical channel of the second interface according to a first mapping relationship between priority parameters of logical channels of the second interface and priority parameters of logical channels of the first interface to obtain the mapped priority parameter of the logical channel of the first interface, and uses the mapped priority parameter as the priority parameter of the highest-priority logical channel of the second interface; or when mapping the priority parameter of the highest-priority logical channel of the first interface to the priority parameter of the logical channel of the second interface: the terminal maps the priority parameter of the highest-priority logical channel of the first interface according to a second mapping relationship between priority parameters of logical channels of the first interface and priority parameters of logical channels of the second interface to obtain the mapped priority parameter of the logical channel of the second interface, and uses the mapped priority parameter as the priority parameter of the highest-priority logical channel of the first interface.

In the above solution, when the priority comparison is performed to determine the interface corresponding to the higher-priority data after the priority parameter of the highest-priority logical channel of the second interface is mapped to the priority parameter of the logical channel of the first interface, the terminal itself maps the priority parameter of the highest-priority logical channel of the second interface according to the first mapping relationship sent by the network side device, and compares the mapped priority parameter of the first interface with the priority parameter of the highest-priority logical channel of the first interface to determine the interface corresponding to the higher-priority data; or when the priority comparison is performed to determine the interface corresponding to the higher-priority data after the priority parameter of the highest-priority logical channel of the first interface is mapped to the priority parameter of the logical channel of the second interface, the terminal itself maps the priority parameter of the highest-priority logical channel of the first interface according to the second mapping relationship sent by the network side device, and compares the mapped priority parameter of the second interface with the priority parameter of the highest-priority logical channel of the second interface to determine the interface corresponding to the higher-priority data.

In a possible implementation, the first interface is a direct communication interface, the second interface is a Uu interface, and the priority parameter of the logical channel is a priority level in a QoS parameter; when mapping the priority parameter of the highest-priority logical channel of the second interface to the priority parameter of the logical channel of the first interface: the terminal receives a priority level in a QoS parameter corresponding to the highest-priority logical channel of the second interface configured by a network side, maps the priority level in the QoS parameter of the second interface to a priority level in a QoS parameter of the first interface according to the first mapping relationship, and uses the priority level in the QoS parameter of the first interface as the mapped priority parameter of the highest-priority logical channel of the second interface; or when mapping the priority parameter of the highest-priority logical channel of the first interface to the priority parameter of the logical channel of the second interface: the terminal maps a priority level in a QoS parameter of the first interface to a priority level in a QoS parameter of the second interface according to the second mapping relationship, and uses the priority level in the QoS parameter of the second interface as the mapped priority parameter of the highest-priority logical channel of the first interface.

The above solutions give a specific solution for the terminal to map the priority level in the QoS parameter corresponding to the highest-priority logical channel of the second interface to the priority level in the QoS parameter of the first interface according to the first mapping relationship and a specific solution for the terminal to map the priority level in the QoS parameter corresponding to the highest-priority logical channel of the first interface to the priority level in the QoS parameter of the second interface according to the second mapping relationship when the first interface is a direct communication interface, the second interface is a Uu interface and the priority parameter of the logical channel is the priority level in the QoS parameter, in order to make the mapping between the first interface and the second interface accurate, further accurately compare the priorities, and determine the interface corresponding to the higher-priority data.

In a possible implementation, the first interface is a Uu interface, the second interface is a direct communication interface, and the priority parameter of the logical channel is a priority level in a QoS parameter; when mapping the priority parameter of the highest-priority logical channel of the second interface to the priority parameter of the logical channel of the first interface: the terminal maps a priority level in a QoS parameter of the second interface to a priority level in a QoS parameter of the first interface according to the first mapping relationship, and uses the priority level in the QoS parameter of the first interface as the mapped priority parameter of the highest-priority logical channel of the second interface; or when mapping the priority parameter of the highest-priority logical channel of the first interface to the priority parameter of the logical channel of the second interface: the terminal receives a priority level in a QoS parameter corresponding to the highest-priority logical channel of the first interface configured by a network side, maps the priority level in the QoS parameter of the first interface to a priority level in a QoS parameter of the second interface according to the second mapping relationship, and uses the priority level in the QoS parameter of the second interface as the mapped priority parameter of the highest-priority logical channel of the first interface.

The above solutions give a specific solution for the terminal to map the priority level in the QoS parameter corresponding to the highest-priority logical channel of the second interface to the priority level in the QoS parameter of the first interface according to the first mapping relationship and a specific solution for the terminal to map the priority level in the QoS parameter corresponding to the highest-priority logical channel of the first interface to the priority level in the QoS parameter of the second interface according to the second mapping relationship when the first interface is a Uu interface, the second interface is a direct communication interface and the priority parameter of the logical channel is the priority level in the QoS parameter, in order to make the mapping between the first interface and the second interface accurate, further accurately compare the priorities, and determine the interface corresponding to the higher-priority data.

In a possible implementation, the priority parameter of the logical channel is a priority parameter in RLC channel configuration information; when mapping the priority parameter of the highest-priority logical channel of the second interface to the priority parameter of the logical channel of the first interface: the terminal maps a priority parameter in RLC channel configuration information of the second interface to a priority parameter in RLC channel configuration information of the first interface according to the first mapping relationship, and uses the priority parameter in the RLC channel configuration information of the first interface as the mapped priority parameter of the highest-priority logical channel of the second interface; or when mapping the priority parameter of the highest-priority logical channel of the first interface to the priority parameter of the logical channel of the second interface: the terminal maps a priority parameter in RLC channel configuration information of the first interface to a priority parameter in RLC channel configuration information of the second interface according to the second mapping relationship, and uses the priority parameter in the RLC channel configuration information of the second interface as the mapped priority parameter of the highest-priority logical channel of the first interface.

The above solutions give a specific solution for the terminal to map the priority parameter in the RLC channel configuration information of the highest-priority logical channel of the second interface to the priority parameter in the RLC channel configuration information of the first interface according to the first mapping relationship and a specific solution for the terminal to map the priority parameter in the RLC channel configuration information of the highest-priority logical channel of the first interface to the priority parameter in the RLC channel configuration information of the second interface according to the second mapping relationship when the priority parameter of the logical channel is the priority parameter in the RLC channel configuration information, in order to make the mapping between the first interface and the second interface accurate, further accurately compare the priorities, and determine the interface corresponding to the higher-priority data.

In a possible implementation, the terminal determines the first mapping relationship by: the terminal determines the first mapping relationship through some or all of broadcast of the network side device, dedicated signaling of the network side device, protocol agreement or pre-configuration; and/or the terminal determines the second mapping relationship in by: the terminal determines the second mapping relationship through some or all of broadcast of the network side device, dedicated signaling of the network side device, protocol agreement or pre-configuration. The above solution gives how the terminal determines the first mapping relationship and the second mapping relationship.

In a possible implementation, when the first interface is a direct communication interface, the second interface is a Uu interface; or when the first interface is a Uu interface, the second interface is a direct communication interface.

The above solution gives which interfaces are the first interface and the second interface.

In a second aspect, an embodiment of the present application provides a data communication method, including: determining, by a network side device, mapping information; sending, by the network side device, the mapping information to a terminal, so that the terminal that does not support data communication simultaneously at first and second interfaces determines highest-priority data of each of the first and second interfaces respectively when the terminal has data communication requirements simultaneously at the first and second interfaces and compares a priority of the highest-priority data of the first interface with a priority of the highest-priority data of the second interface according to the mapping information to determine an interface corresponding to higher-priority data.

In the above solution, the network side device sends the determined mapping information to the terminal, so that when the terminal that does not support data communication simultaneously at first and second interfaces has data communication requirements simultaneously at the first and second interfaces, the terminal determines the highest-priority data of the first interface and the highest-priority data of the second interface, then determines the priority parameter of the highest-priority data of the first interface and the priority parameter of the highest-priority data of the second interface according to the mapping information sent by the network side device, and performs the priority comparison on the highest-priority data of the first interface and the highest-priority data of the second interface to determine the interface corresponding to the higher-priority data; and further, the terminal sends data on the interface with higher priority. Thus, when the terminal has data communication simultaneously at the first and second interfaces, the terminal may determine which interface to preferentially transmit data according to the mapping information sent by the network side device, avoiding the data communication conflict.

In a possible implementation, the mapping information includes some or all of: indicating a priority parameter of the first interface corresponding to a highest-priority logical channel of the second interface in RLC channel configuration information corresponding to the logical channel; indicating a priority parameter of the second interface corresponding to a highest-priority logical channel of the first interface in RLC channel configuration information corresponding to the logical channel; indicating a priority level of a QoS parameter of the first interface corresponding to the highest-priority logical channel of the second interface in RLC channel configuration information corresponding to the logical channel; indicating a priority level of a QoS parameter of the second interface corresponding to the highest-priority logical channel of the first interface in RLC channel configuration information corresponding to the logical channel; a first mapping relationship between priority parameters of logical channels of the second interface and priority parameters of logical channels of the first interface; a second mapping relationship between priority parameters of logical channels of the first interface and priority parameters of logical channels of the second interface.

The above solution specifically gives which information is the mapping information sent by the network side device to the terminal, so that the terminal compares the highest-priority data of the first interface with the highest-priority data of the second interface according to the received mapping information to determine the interface corresponding to the higher-priority data, and preferentially performs the data communication on the interface corresponding to the higher-priority data, avoiding the data communication conflict.

In a possible implementation, when the mapping information includes the first mapping relationship, sending, by the network side device, the mapping information to the terminal, includes: sending, by the network side device, the first mapping relationship to the terminal through broadcast or dedicated signaling; and/or when the mapping information includes the second mapping relationship, sending, by the network side device, the mapping information to the terminal, includes: sending, by the network side device, the second mapping relationship to the terminal through broadcast or dedicated signaling.

The above solution gives how the network side device informs the terminal of the mapping information.

In a possible implementation, when the first interface is a direct communication interface, the second interface is a Uu interface; or when the first interface is a Uu interface, the second interface is a direct communication interface.

The above solution gives which specific interfaces are the first interface and the second interface.

In a third aspect, an embodiment of the present application provides a terminal for data communication. The terminal is a terminal that does not support data communication simultaneously at first and second interfaces, and the terminal includes: a processor, a memory and a transceiver; where the processor is configured to read a program in the memory and perform: determining highest-priority data of each of the first and second interfaces respectively when there are data communication requirements simultaneously at the first and second interfaces; comparing a priority of the highest-priority data of the first interface with a priority of the highest-priority data of the second interface to determine an interface corresponding to higher-priority data; sending data through the determined interface.

In a fourth aspect, an embodiment of the present application provides a network side device for data communication, including: a processor, a memory and a transceiver; where the processor is configured to read a program in the memory and perform: determining mapping information; and sending the mapping information to a terminal, so that the terminal that does not support data communication simultaneously at first and second interfaces determines highest-priority data of each of the first and second interfaces respectively when the terminal has data communication requirements simultaneously at the first and second interfaces and compares a priority of the highest-priority data of the first interface with a priority of the highest-priority data of the second interface according to the mapping information to determine an interface corresponding to higher-priority data.

In a fifth aspect, an embodiment of the present application provides a terminal for data communication. The terminal is a terminal that does not support data communication simultaneously at first and second interfaces, and the terminal includes: a first determining module configured to determine highest-priority data of each of the first and second interfaces respectively when there are data communication requirements simultaneously at the first and second interfaces; a comparison module configured to compare a priority of the highest-priority data of the first interface with a priority of the highest-priority data of the second interface to determine an interface corresponding to higher-priority data; a first sending module configured to send data through the determined interface.

In a sixth aspect, an embodiment of the present application provides a network side device for data communication, including: a second determining module configured to determine mapping information; a second sending module configured to send the mapping information to a terminal, so that the terminal that does not support data communication simultaneously at first and second interfaces determines highest-priority data of each of the first and second interfaces respectively when the terminal has data communication requirements simultaneously at the first and second interfaces and compares a priority of the highest-priority data of the first interface with a priority of the highest-priority data of the second interface according to the mapping information to determine an interface corresponding to higher-priority data.

In a seventh aspect, an embodiment of the present application provides a computer storage medium storing a computer program thereon, where the program, when executed by a processor, implements any solution in the first aspect or the second aspect described above.

Furthermore, the technical effects brought about by any implementation in the second to fourth aspects may refer to the technical effects brought about by different implementations of the first aspect, and will not be repeated here.

BRIEF DESCRIPTION OF THE DRAWINGS

In order to illustrate the technical solutions in embodiments of the present application more clearly, the accompanying drawings which need to be used in describing embodiments will be introduced below briefly. Obviously the accompanying drawings described below are only some embodiments of the present application, and other accompanying drawings may also be obtained by those ordinary skilled in the art according to these accompanying drawings without creative labor.

DETAILED DESCRIPTION

In the following, some terms in embodiments of the present application are explained to facilitate the understanding of those skilled in the art.

(1) In embodiments of the present application, the nouns "network" and "system" are generally used alternatively, but those skilled in the art may understand the meaning thereof.

(2) The term "a plurality of" in embodiments of the present application refers to two or more, and other quantifiers are similar thereto.

(3) "and/or" describes the association relationship of the associated objects, and indicates that there may be three relationships, for example, A and/or B may represent: only A, both A and B, and only B. The character "/" generally indicates that the associated objects have a kind of "or" relationship.

A terminal may use the cellular network interface (Uu interface) for data communication, and may also use the direct communication interface (Sidelink interface) for data communication.

Figure 1:
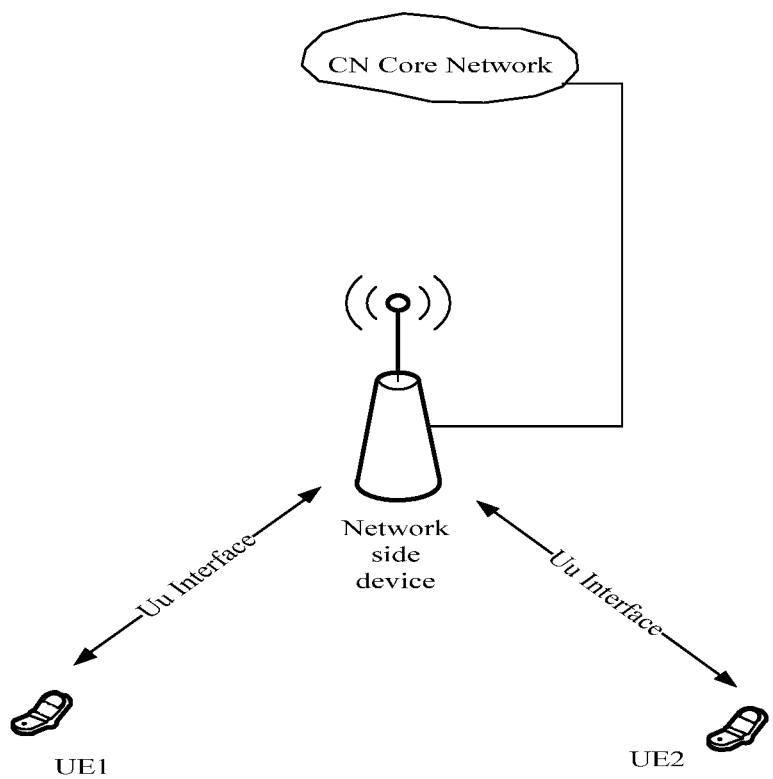
FIG. 1 is a schematic diagram of the cellular network communication mode.

As shown in FIG. 1, a schematic diagram of the cellular network communication mode is illustrated, that is, the terminal and the network side device perform communication of the uplink and downlink data/control information through the Uu interface. During cellular network communication, the network side device may perform the mapping from QoS flow (Quality of Service flow) to DRB (Data Radio Bearer). For the uplink, when the network side device adds a DRB, the network side device may map the Priority Level in the QoS parameter corresponding to the DRB to the Priority parameter used by the air interface and notify the terminal of the Priority parameter, where the Priority parameter is mainly used for the uplink LCP (Logical Channel Prioritization) process in the cellular network communication mode.

Figure 2:
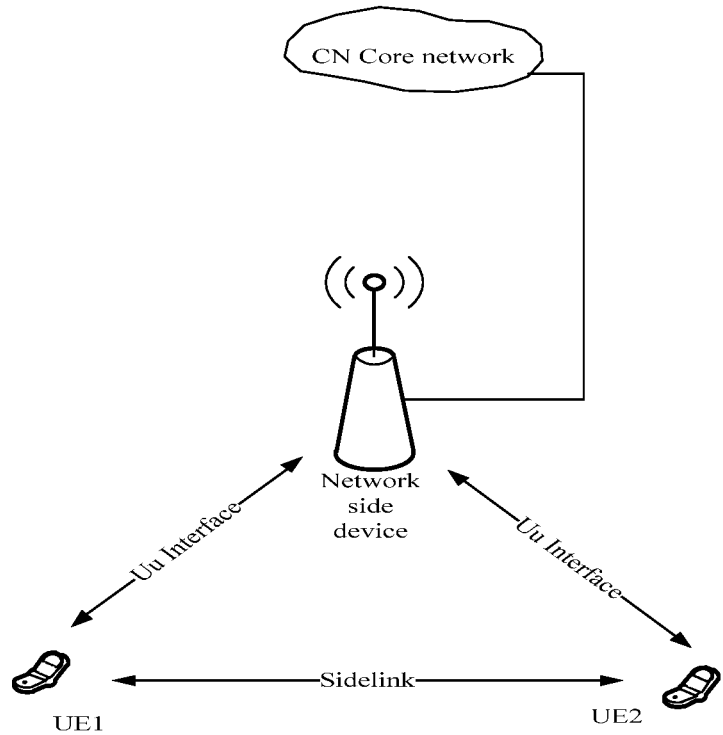
FIG. 2 is a schematic diagram of the direct communication mode.

As shown in FIG. 2, a schematic diagram of the direct communication mode is illustrated. The direct communication means that adjacent terminals may perform the data communication through a direct communication link (Sidelink) within a short range. In the direct communication mode, the network side device may perform the mapping from QoS flow to SLRB (Sidelink Radio Bearer) and also need to perform the LCP process, and the parameter Priority required to perform the LCP process is also determined based on the Priority Level in QoS parameter.

At present, the terminal may only perform the data communication smoothly when one interface has the data communication requirement. When two interfaces have data communication requirements at the same time, the data communication conflict may occur, and the terminal itself cannot determine which interface is preferred for data communication.

In embodiments of the present application, the terminal is a device with the wireless communication function, and may be deployed on land, including indoor or outdoor, handheld or vehicle-mounted; or may also be deployed on the water (such as ship, etc.); or may also be deployed in the air (e.g., on the airplane, balloon and satellite, etc.). The terminal may be: a mobile phone, a pad, a computer with wireless transceiver function, a Virtual Reality (VR) terminal, an Augmented Reality (AR) terminal, a wireless terminal in the industrial control, a wireless terminal in the self driving, a wireless terminal in the remote medical, a wireless terminal in the smart grid, a wireless terminal in the transportation safety, a wireless terminal in the smart city, a wireless terminal in the smart home, etc.; or may be various forms of UE, Mobile Station (MS), terminal device.

The network side device may be a base station, which is a device that provides the wireless communication function for the terminal, including but not limited to: a base station, a gNB in 5G, a Radio Network Controller (RNC), a Node B (NB), a Base Station Controller (BSC), a Base Transceiver Station (BTS), a home base station (for example, home evolved NodeB or a Home Node B (HNB)), a Base Band Unit (BBU), a Transmission and Reception Point (TRP), a Transmitting Point (TP), a mobile switching center, etc. The base station in the present application may also be a device that provides the wireless communication function for the terminal in other communication systems that may appear in the future.

In order to make the objects, technical solutions and advantages of the present application clearer, the present application will be further illustrated below in details with reference to the accompanying drawings. Obviously the described embodiments are merely a part of embodiments of the present application but not all embodiments. Based upon embodiments of the present application, all of other embodiments obtained by those ordinary skilled in the art without creative work pertain to the protection scope of the present application.

Based on the above scenario, an embodiment of the present application provides a data communication method, to solve the problem of data communication conflict caused by the unclear terminal behavior when the terminal that does not support data communication simultaneously at first and second interfaces has data communication requirements simultaneously at the first and second interfaces. In the present application, when a terminal that does not support data communication simultaneously at first and second interfaces has data communication requirements simultaneously at the first and second interfaces, the terminal compares the priority of the highest-priority data of the first interface with the priority of the highest-priority data of the second interface to determine the higher-priority data and further determine the interface corresponding to the higher-priority data, and sends data through the determined interface and performs data communication through the interface corresponding to the higher-priority data, avoiding the data communication conflict when there are data communication requirements simultaneously at the first and second interfaces.

In an embodiment of the present application, when the terminal that does not support data communication simultaneously at first and second interfaces has data communication requirements simultaneously at the first and second interfaces, the terminal determines the highest-priority data of each of the first and second interfaces respectively.

When determining the highest-priority data of each of the first and second interfaces, for the first interface, the terminal sorts all pieces of the data that needs to be communicated in the first interface according to the priorities to determine the highest-priority data; or compares the priorities of all pieces of the data that needs to be communicated in the first interface to determine the highest-priority data.

Similarly, for the second interface, the terminal sorts all pieces of the data that needs to be communicated in the second interface according to the priorities to determine the highest-priority data; or compares the priorities of all pieces of the data that needs to be communicated in the second interface to determine the highest-priority data.

The above methods for determining the highest-priority data of each of the first and second interfaces respectively are just examples, and any method for determining the highest-priority data for all pieces of the data that needs to be communicated in the same interface is applicable to the present application.

After determining the highest-priority data for each of the first and second interfaces, the terminal compares the priority of the highest-priority data of the first interface with the priority of the highest-priority data of the second interface, determines the higher-priority data and determines the interface corresponding to the higher-priority data, and sends data through the determined interface.

For example, the highest-priority data determined for the first interface is data A, and the highest-priority data determined for the second interface is data B. The priorities of the data A and data B are compared. If the priority of the data A is higher than the priority of the data B, the data is sent on the first interface corresponding to the data A.

Here, in an embodiment of the present application, when the first interface is a direct communication interface, the second interface is a Uu interface; when the first interface is a Uu interface, the second interface is a direct communication interface.

In an embodiment of the present application, after determining the highest-priority data of the first interface and the highest-priority data of the second interface, the terminal determines whether the highest-priority data of the first interface and the highest-priority data of the second interface are the same type of data.

If the highest-priority data of the first interface and the highest-priority data of the second interface are the same type of data, the priority of the highest-priority data of each of the first and second interfaces is compared according to set rules, that is, the priority of the highest-priority data of the first interface is compared with the priority of the highest-priority data of the second interface according to the set rules, to determine the higher-priority data and further determine the interface corresponding to the higher-priority data; or if the highest-priority data of the first interface and the highest-priority data of the second interface are different types of data, the higher-priority data is determined according to a set priority order, that is, the priority of the highest-priority data of the first interface is compared with the priority of the highest-priority data of the second interface according to the set priority order, to determine the higher-priority data and further determine the interface corresponding to the higher-priority data.

Here, the data types are mainly divided into three categories: 1. Data from common control channel and/or MAC CE for carrying important control information; 2. Data from logical channels other than the common control channel and/or physical layer control information; 3. MAC CE for carrying unimportant control information.

Here, the MAC CE for carrying important control information includes some or all of: Cell Radio Network Temporary Identity (C-RNTI) MAC CE; Configured Grant Confirmation MAC CE; Buffer Status Report (BSR) MAC CE other than Padding BSR MAC CE; Power Headroom Report (PHR) MAC CE, including but not limited to: Single Entry PHR MAC CE or Multiple Entry PHR MAC CE.

Here, the MAC CE for carrying unimportant control information includes some or all of: Recommended bit rate query MAC CE; Padding BSR MAC CE; Sidelink BSR MAC CE.

In an embodiment of the present application, after determining whether the highest-priority data of the first interface and the highest-priority data of the second interface are the same type of data, the terminal compares the priority of the highest-priority data of the first interface with the priority of the highest-priority data of the second interface to determine the interface corresponding to the higher-priority data in different ways according to the determination result, which will be introduced in detail through the following embodiments.

Embodiment 1: the highest-priority data of the first interface and the highest-priority data of the second interface are different types of data.

When the terminal determines that the highest-priority data of the first interface and the highest-priority data of the second interface are different types of data and the terminal compares the priority of the highest-priority data of the first interface with the priority of the highest-priority data of the second interface to determine the interface corresponding to the higher-priority data, the terminal determines the higher-priority data according to a preset priority order and further determines the interface corresponding to the higher-priority data.

Here, the preset priority order is: a priority of data from common control channel and/or MAC CE for carrying important control information is higher than a priority of data from logical channels other than the common control channel and/or physical layer control information; the priority of data from logical channels other than the common control channel and/or physical layer control information is higher than a priority of MAC CE for carrying unimportant control information.

In an embodiment of the present application, the priority of the data from the common control channel and/or the MAC CE for carrying important control information is higher than the priority of the MAC CE for carrying unimportant control information.

For example, the highest-priority data of the first interface is the data from the common control channel and/or the MAC CE carrying important control information, and the highest-priority data of the second interface is the data from logical channels other than the common control channel and/or physical layer control information. The highest-priority data of the first interface and the highest-priority data of the second interface are different types of data, and then it is determined that the priority of the highest-priority data of the first interface is higher than the priority of the highest-priority data of the second interface according to the above priority order, so the terminal determines to send data through the first interface.

For example, the highest-priority data of the first interface is the MAC CE carrying unimportant control information, and the highest-priority data of the second interface is the data from the common control channel and/or the MAC CE carrying important control information. The highest-priority data of the first interface and the highest-priority data of the second interface are different types of data, and then it is determined that the priority of the highest-priority data of the second interface is higher than the priority of the highest-priority data of the first interface according to the above priority order, so the terminal determines to send data through the second interface.

In an implementation, when the highest-priority data of the first interface and the highest-priority data of the second interface are different types of data, the higher priority of the highest-priority data of the first interface and the highest-priority data of the second interface may be accurately determined according to the priority order, so the terminal may determine the interface corresponding to the higher-priority data according to the determined priority order and send the data through the determined interface corresponding to the higher-priority data, avoiding the data communication conflict generated when two interfaces have data communication requirements at the same time.

Embodiment 2: the highest-priority data of the first interface and the highest-priority data of the second interface are the same type of data.

When the terminal determines that the highest-priority data of the first interface and the highest-priority data of the second interface are the same type of data, the terminal compares the priority of the highest-priority data of the first interface with the priority of the highest-priority data of the second interface according to the set rules to determine the interface corresponding to the higher-priority data.

Here, the set rules include some or all of the following rules.

Rule 1: the terminal determines the interface corresponding to the higher-priority data according to one of network configuration, protocol stipulation, pre-configuration or randomization when the highest-priority data of each of the first and second interfaces determined respectively are both data from common control channel and/or MAC CE for carrying important control information.

Rule 2: the terminal determines the interface corresponding to the higher-priority data according to one of network configuration, protocol stipulation, pre-configuration or randomization when the highest-priority data of each of the first and second interfaces determined respectively are both MAC CE for carrying unimportant control information.

Rule 3: the terminal compares a priority parameter of a highest-priority logical channel of the first interface with a priority parameter of a highest-priority logical channel of the second interface to determine the interface corresponding to the higher-priority data when the highest-priority data of each of the first and second interfaces determined respectively are both data from logical channels other than the common control channel and/or physical layer control information.

In an embodiment of the present application, since the data types are divided into three types, the set rules corresponding to different types are different when the highest-priority data of the first interface and the highest-priority data of the second interface are the same type of data, which are divided into three cases as follows.

1. When the highest-priority data of the first interface and the highest-priority data of the second interface are both the data from the common control channel and/or MAC CE for carrying important control information, the above Rule 1 is used.

2. When the highest-priority data of the first interface and the highest-priority data of the second interface are both MAC CE for carrying unimportant control information, the above Rule 2 is used.

3. When the highest-priority data of the first interface and the highest-priority data of the second interface are both the data from logical channels other than the common control channel and/or physical layer control information, the above Rule 3 is used.

The above-mentioned cases will be specifically introduced.

Case 1: the highest-priority data of the first interface and the highest-priority data of the second interface are both the data from the common control channel and/or MAC CE for carrying important control information.

The highest-priority data of the first interface and the highest-priority data of the second interface are both the data from the common control channel; or the highest-priority data of the first interface and the highest-priority data of the second interface are both MAC CEs for carrying important control information; or the highest-priority data of the first interface is the data from the common control channel, and the highest-priority data of the second interface is MAC CE for carrying important control information; or the highest-priority data of the first interface is MAC CE for carrying important control information, and the highest-priority data of the second interface is the data from the common control channel.

When the highest-priority data of the first interface and the highest-priority data of the second interface are both the data from the common control channel and/or MAC CE for carrying important control information, the terminal determines the interface corresponding to the higher-priority data according to one of network configuration, protocol stipulation, pre-configuration or randomization.

Here, the priority order between the data from the common control channel and/or the MAC CE for carrying important control information of the first interface and the second interface is configured by the network; the priority order between the data from the common control channel and/or the MAC CE for carrying important control information of the first interface and the second interface is stipulated by protocol; the priority order between the data from the common control channel and/or the MAC CE for carrying important control information of the first interface and the second interface is pre-configured; the priority order between the data from the common control channel and/or the MAC CE for carrying important control information of the first interface and the second interface is randomly determined.

It is assumed that the network configures that the priority of the data from the common control channel and/or the MAC CE for carrying important control information of the first interface is higher than the priority of the data from the common control channel and/or the MAC CE for carrying important control information of the second interface. When the highest-priority data of the first interface and the highest-priority data of the second interface are both the data from the common control channel, it is determined that the priority of the highest-priority data of the first interface is higher than the priority of the highest-priority data of the second interface according to the network configuration, so the terminal determines to send data through the first interface.

In an implementation, when the first interface and the second interface simultaneously have data communication requirements for the data from the common control channel data and/or the MAC CE for carrying important control information, the terminal determines the higher-priority data and further determines the interface corresponding to the higher-priority data according to one of network configuration, protocol stipulation, pre-configuration or random determination at the conflict moment for sending data, and the terminal sends data preferentially on the interface corresponding to the higher-priority data, avoiding the data communication conflict.

Case 2: the highest-priority data of the first interface and the highest-priority data of the second interface are both MAC CEs for carrying unimportant control information.

When the highest-priority data of the first interface and the highest-priority data of the second interface are both MAC CEs for carrying unimportant control information, the terminal determines the interface corresponding to the higher-priority data according to one of network configuration, protocol stipulation, pre-configuration or randomization.

Here, the priority order between the MAC CEs for carrying unimportant control information of the first interface and the second interface is configured by the network; the priority order between the MAC CEs for carrying unimportant control information of the first interface and the second interface is stipulated by protocol; the priority order between the MAC CEs for carrying unimportant control information of the first interface and the second interface is pre-configured; the priority order between the MAC CEs for carrying unimportant control information of the first interface and the second interface is randomly determined.

It is assumed that the network configures that the priority of the MAC CE for carrying unimportant control information of the first interface is higher than the priority of the MAC CE for carrying unimportant control information of the second interface. When the highest-priority data of the first interface and the highest-priority data of the second interface are both MAC CEs for carrying unimportant control information, it is determined that the priority of the highest-priority data of the first interface is higher than the priority of the highest-priority data of the second interface according to the network configuration, so the terminal determines to send data through the first interface.

In an implementation, when the first interface and the second interface simultaneously have data communication requirements for the MAC CEs for carrying unimportant control information, the terminal determines the higher-priority data and further determines the interface corresponding to the higher-priority data according to one of network configuration, protocol stipulation, pre-configuration or random determination at the conflict moment for sending data, and the terminal sends data preferentially on the interface corresponding to the higher-priority data, avoiding the data communication conflict.

Case 3: the highest-priority data of the first interface and the highest-priority data of the second interface are both the data from logical channels other than the common control channel and/or physical layer control information.

The highest-priority data of the first interface and the highest-priority data of the second interface are both the data from logical channels other than the common control channel; or the highest-priority data of the first interface and the highest-priority data of the second interface are both the physical layer control information; or the highest-priority data of the first interface is the data from logical channels other than the common control channel, and the highest-priority data of the second interface is the physical layer control information; or the highest-priority data of the first interface is the physical layer control information, and the highest-priority data of the second interface is the data from logical channels other than the common control channel.

When the highest-priority data of the first interface and the highest-priority data of the second interface are both the data from logical channels other than the common control channel and/or physical layer control information, the terminal compares a priority parameter of a highest-priority logical channel of the first interface with a priority parameter of a highest-priority logical channel of the second interface to determine the interface corresponding to the higher-priority data.

Here, when the highest-priority data is the physical layer control information, the physical layer control information includes but is not limited to some or all of: SR, HARQ feedback, CSI.

Thus, the highest-priority logical channel is a logical channel triggering an SR when the physical layer control information is the SR; the highest-priority logical channel is a highest-priority logical channel contained in a TB corresponding to an HARQ feedback when the physical layer control information is the HARQ feedback; the highest-priority logical channel is a highest-priority logical channel on which the terminal currently has data to be sent when the physical layer control information is CSI.

Here, when the highest-priority data is the data from logical channels other than the common control channel, the highest-priority logical channel is the logical channel corresponding to an RB (Radio Bearer), which is DRB/SRB (Signalling Radio Bearer).

In an embodiment of the present application, when the terminal compares the priority parameter of the highest-priority logical channel of the first interface with the priority parameter of the highest-priority logical channel of the second interface to determine the interface corresponding to the higher-priority data, the step may be implemented in the following ways.

In a first way: mapping the priority parameter of the highest-priority logical channel of the first interface to a priority parameter of a logical channel of the second interface, and comparing the priority parameter of the highest-priority logical channel of the first interface with the priority parameter of the highest-priority logical channel of the second interface to determine the interface corresponding to the higher-priority data.

In an embodiment of the present application, when the priority parameter of the highest-priority logical channel of the first interface is mapped to the priority parameter of the logical channel of the second interface, the network side device may be the executing body. The network side device maps the priority parameter of the highest-priority logical channel of the first interface to the priority parameter of the logical channel of the second interface, and sends the obtained priority parameter of the logical channel of the second interface after the mapping to the terminal as the priority parameter of the highest-priority logical channel of the first interface. Further, the terminal compares the priority parameter of the logical channel of the second interface as the priority parameter of the highest-priority logical channel of the first interface with the priority parameter of the highest-priority logical channel of the second interface, to determine the higher-priority data and thus determine the interface corresponding to the higher-priority data.

Alternatively, the terminal may be the executing body. The terminal maps the priority parameter of the highest-priority logical channel of the first interface to the priority parameter of the logical channel of the second interface according to a second mapping relationship between priority parameters of logical channels of the first interface and priority parameters of logical channels of the second interface configured by the network side device, and uses the obtained priority parameter of the logical channel of the second interface after the mapping as the priority parameter of the highest-priority logical channel of the first interface. Further, the terminal compares the priority parameter of the logical channel of the second interface as the priority parameter of the highest-priority logical channel of the first interface with the priority parameter of the highest-priority logical channel of the second interface, to determine the higher-priority data and thus determine the interface corresponding to the higher-priority data.

The detailed introduction will be given based on the above content.

I. The Executing Body for Mapping is the Network Side Device.

The network side device maps the priority parameter of the highest-priority logical channel of the first interface to a priority parameter of a logical channel of the second interface and sends the mapped priority parameter of the logical channel of the second interface to the terminal, so that the terminal uses the mapped priority parameter of the logical channel of the second interface received as the priority parameter of the highest-priority logical channel of the first interface.

Here, the priority parameter of the logical channel includes some or all of: a priority level in a QoS parameter; a priority parameter in RLC channel configuration information.

Case A1: when the priority parameter of the logical channel is a priority parameter in the RLC channel configuration information, the terminal maps the priority parameter of the highest-priority logical channel of the first interface to the priority parameter of the logical channel of the second interface according to mapping information of the network side device.

Here, the mapping information of the network side device is: indicating a priority parameter of the second interface corresponding to the highest-priority logical channel of the first interface in the RLC channel configuration information corresponding to the logical channel.

That is, the network side device maps the priority parameter in the RLC channel configuration information of the highest-priority logical channel of the first interface to a priority parameter of the second interface, and sends the mapped priority parameter of the second interface to the terminal as the priority parameter of the highest-priority logical channel of the first interface.

Here, the network side device maps the priority parameter in the RLC channel configuration information of the highest-priority logical channel of the first interface to the priority parameter of the second interface through an agreement rule of a set mapping relationship.

For example, the first interface is a direct communication interface and the second interface as a Uu interface. When the network side device maps the priority parameter in the RLC channel configuration information corresponding to the highest-priority logical channel of the first interface to the priority parameter of the second interface according to the agreement rule of the set mapping relationship, the agreement rule of the set mapping relationship is as shown in Table 1.

TABLE 1

| Priority parameter of logical channel of direct communication interface is a priority parameter in RLC channel configuration information | Priority parameter of logical channel of Uu interface is a priority parameter in RLC channel configuration information |
|---|---|
| 0 | 0 |
| 1 | 2 |
| 2 | 4 |
| 3 | 6 |
| 4 | 8 |
| 5 | 10 |
| 6 | 12 |
| 7 | 14 |

The network side device maps the priority parameter in the RLC channel configuration information of the highest-priority logical channel of the first interface according to the agreement rule of the mapping relationship, and obtains the priority parameter of the second interface after the mapping.

The network side device indicates the priority parameter of the second interface corresponding to the highest-priority logical channel of the first interface in the RLC channel configuration information corresponding to the logical channel, and sends the priority parameter of the second interface to the terminal.

The terminal receives the priority parameter of the second interface in the RLC channel configuration information corresponding to the highest-priority logical channel of the first interface configured by the network side device, and uses the priority parameter of the second interface in the RLC channel configuration information as the mapped priority parameter of the highest-priority logical channel of the first interface.

Further, the terminal compares the priority parameter of the second interface obtained after mapping the priority parameter in the RLC channel configuration information of the highest-priority logical channel of the first interface with the priority parameter in the RLC channel configuration information of the highest-priority logical channel of the second interface, to determine the higher-priority data and thus determine the interface corresponding to the higher-priority data.

After mapping the priority parameter in the RLC channel configuration information of the highest-priority logical channel of the first interface and obtaining the priority parameter of the second interface after mapping, the priority parameter in the RLC channel configuration information of the highest-priority logical channel of the first interface is represented by the priority parameter of the second interface obtained after mapping, so the priority of the mapped priority parameter of the highest-priority logical channel of the first interface may be directly compared with the priority of the priority parameter in the RLC channel configuration information of the highest-priority logical channel of the second interface to determine the higher priority.

Figure 3:
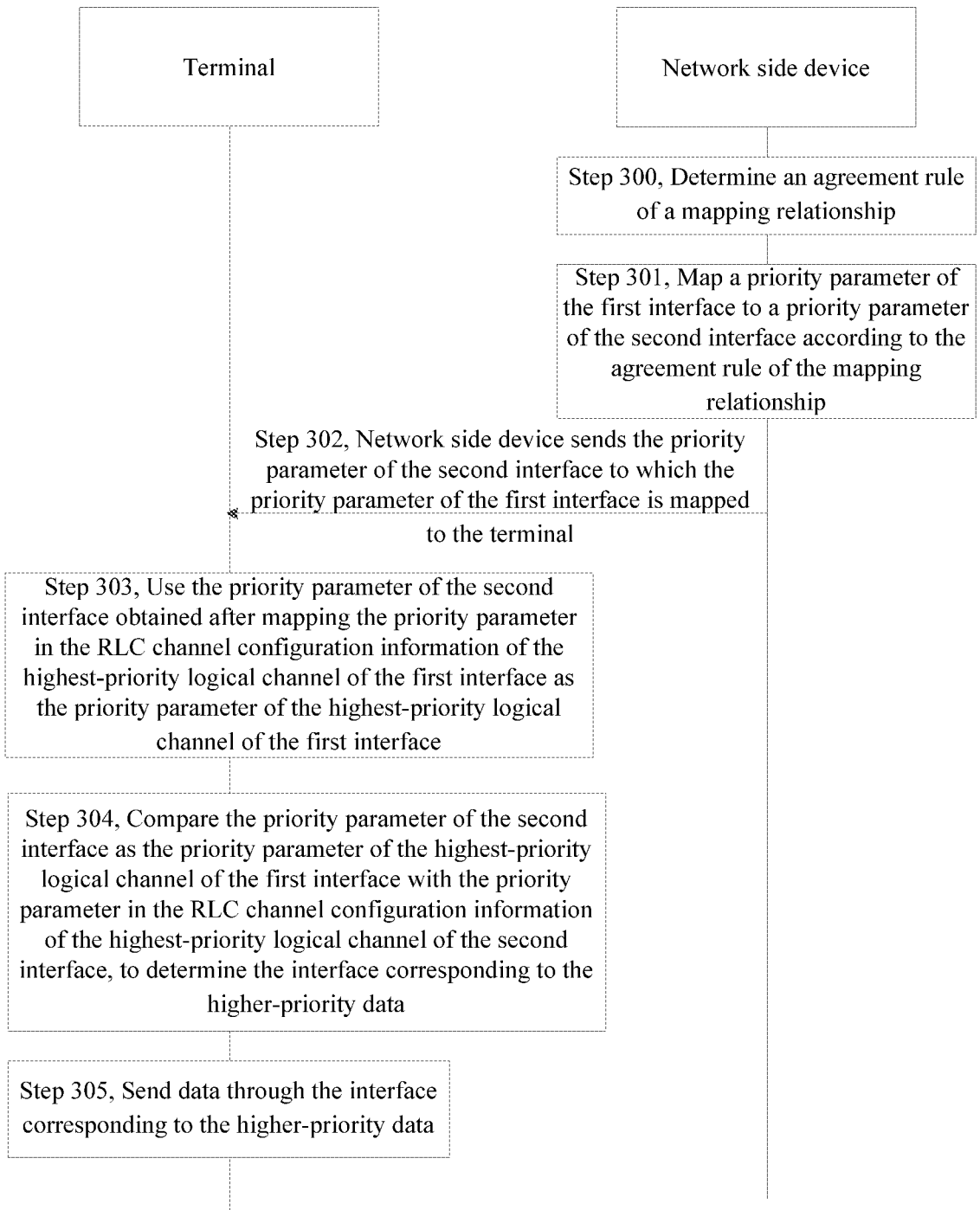
FIG. 3 is a first schematic flowchart of a method for determining an interface corresponding to higher-priority data according to an embodiment of the present application.

As shown in FIG. 3, a first schematic diagram of a method process of comparing the priority parameter of the highest-priority logical channel of the first interface with the priority parameter of the highest-priority logical channel of the second interface to determine the interface corresponding to the higher-priority data according to an embodiment of the present application is illustrated.

Step 300: a network side device determines an agreement rule of a mapping relationship.

Step 301: the network side device maps a priority parameter in the RLC channel configuration information of the highest-priority logical channel of the first interface to a priority parameter of the second interface according to the agreement rule of the mapping relationship.

Step 302: the network side device indicates the priority parameter of the second interface corresponding to the highest-priority logical channel of the first interface in the RLC channel configuration information corresponding to the logical channel, and sends the priority parameter of the second interface to the terminal.

That is, the network side device notifies the terminal of the priority parameter of the second interface after mapping the priority parameter in the RLC channel configuration information of the highest-priority logical channel of the first interface.

Step 303: the terminal uses the priority parameter of the second interface obtained after mapping the priority parameter in the RLC channel configuration information of the highest-priority logical channel of the first interface as the priority parameter of the highest-priority logical channel of the first interface according to the received priority parameter of the second interface in the RLC channel configuration information corresponding to the highest-priority logical channel of the first interface configured by the network side device.

Step 304: the terminal compares the priority parameter of the second interface as the priority parameter of the highest-priority logical channel of the first interface with the priority parameter in the RLC channel configuration information of the highest-priority logical channel of the second interface, to determine the interface corresponding to the higher-priority data.

Step 305: the terminal sends data through the interface corresponding to the higher-priority data.

Case B1: when the priority parameter of the logical channel is the priority level in the QoS parameter, the terminal maps the priority parameter of the highest-priority logical channel of the first interface to the priority parameter of the logical channel of the second interface according to mapping information of the network side device.

Here, the mapping information of the network side device is: indicating the priority level in the QoS parameter of the second interface corresponding to the highest-priority logical channel of the first interface in the RLC channel configuration information corresponding to the logical channel.

That is, the network side device maps the priority level in the QoS parameter of the highest-priority logical channel of the first interface to the priority level in the QoS parameter of the second interface, and uses the mapped priority level in the QoS parameter of the second interface as the priority parameter of the highest-priority logical channel of the first interface.

Here, the network side device maps the priority level in the QoS parameter of the highest-priority logical channel of the first interface to the priority level in the QoS parameter of the second interface through an agreement rule of a set mapping relationship.

For example, the first interface is a direct communication interface and the second interface as a Uu interface. When the network side device maps the priority level in the QoS parameter of the highest-priority logical channel of the first interface to the priority level in the QoS parameter of the second interface according to the agreement rule of the set mapping relationship, the agreement rule of the set mapping relationship is as shown in Table 2.

TABLE 2

| Priority level in QoS parameter of direct communication interface | Priority level in QoS parameter of Uu interface |
|---|---|
| 0 | 0 |
| 1 | 11 |
| 2 | 22 |
| 3 | 32 |
| 4 | 45 |
| 5 | 61 |
| 6 | 76 |
| 7 | >90 |

The network side device maps the priority level in the QoS parameter of the highest-priority logical channel of the first interface according to the agreement rule of the mapping relationship, and obtains the priority level in the QoS parameter of the second interface after the mapping.

The network side device indicates the priority level in the QoS parameter of the second interface corresponding to the highest-priority logical channel of the first interface in the RLC channel configuration information corresponding to the logical channel, and sends the priority level in the QoS parameter of the second interface to the terminal.

The terminal receives the priority level in the QoS parameter of the second interface in the RLC channel configuration information corresponding to the highest-priority logical channel of the first interface configured by the network side device, and uses the priority level in the QoS parameter of the second interface in the RLC channel configuration information as the mapped priority parameter of the highest-priority logical channel of the first interface.

Further, the terminal compares the priority level in the QoS parameter of the second interface obtained after mapping the priority level in the QoS parameter of the highest-priority logical channel of the first interface with the priority level in the QoS parameter of the highest-priority logical channel of the second interface, to determine the higher-priority data and thus determine the interface corresponding to the higher-priority data.

After mapping the priority level in the QoS parameter of the highest-priority logical channel of the first interface and obtaining the priority level in the QoS parameter of the second interface after mapping, the priority level in the QoS parameter of the highest-priority logical channel of the first interface is represented by the priority level in the QoS parameter of the second interface obtained after mapping, so the priority of the mapped priority parameter of the highest-priority logical channel of the first interface may be directly compared with the priority level in the QoS parameter of the highest-priority logical channel of the second interface to determine the higher priority.

It should be noted that the method process of the case B1 may refer to the method process of the case A1 in the first way, and the details are not repeated here.

In an embodiment of the present application, when the priority parameter of the logical channel is the priority level in the QoS parameter, if the first interface or the second interface is a direct communication interface, the QoS parameter is a PQI (ProSe QoS Identifier); if the first interface or the second interface is a Uu interface, the QoS parameter is a 5QI (5G QoS Identifier).

II. The Executing Body for Mapping is the Terminal.

The terminal maps the priority parameter of the highest-priority logical channel of the first interface according to a second mapping relationship between priority parameters of logical channels of the first interface and priority parameters of logical channels of the second interface to obtain the priority parameter of the logical channel of the second interface after the mapping, and uses the mapped priority parameter as the priority parameter of the highest-priority logical channel of the first interface.

Here, the second mapping relationship between priority parameters of logical channels of the first interface and priority parameters of logical channels of the second interface is sent by the network side device to the terminal through broadcast or dedicated signaling, or is determined by the terminal according to protocol stipulation or pre-configuration.

Here, the priority parameter of the logical channel includes: a priority level in a QoS parameter; a priority parameter in RLC channel configuration information.

Case C1. taking the second mapping relationship sent by the network side device as an example, when the priority parameter of the logical channel is a priority parameter in the RLC channel configuration information, the terminal maps the priority parameter of the highest-priority logical channel of the first interface to the priority parameter of the logical channel of the second interface according to mapping information of the network side device.

Here, the mapping information of the network side device is: the second mapping relationship between priority parameters of logical channels of the first interface and priority parameters of logical channels of the second interface.

The second mapping relationship is the agreement rule of a mapping relationship set in the network side device. For example, the first interface is a direct communication interface and the second interface is a Uu interface, and the second mapping relationship is as shown in Table 3.

TABLE 3

| Priority parameter of logical channel of Uu interface is a priority parameter in RLC channel configuration information | Priority parameter of logical channel of Uu interface is a priority parameter in RLC channel configuration information |
| --- | --- |
| 0 | 0 |
| 1 | 2 |
| 2 | 4 |
| 3 | 6 |
| 4 | 8 |
| 5 | 10 |
| 6 | 12 |
| 7 | 14 |

The network side device sends the second mapping relationship between priority parameters in the RLC channel configuration information of the first interface and priority parameters in the RLC channel configuration information of the second interface to the terminal.

When the terminal has data communication requirements simultaneously on the first interface and the second interface, the terminal maps the priority parameter in the RLC channel configuration information of the highest-priority logical channel of the first interface according to the second mapping relationship between priority parameters in the RLC channel configuration information of the first interface and priority parameters in the RLC channel configuration information of the second interface, obtains the mapped priority parameter in the RLC channel configuration information of the second interface, and then uses the mapped priority parameter in the RLC channel configuration information of the second interface as the priority parameter of the highest-priority logical channel of the first interface.

Further, the terminal compares the priority parameter of the highest-priority logical channel of the first interface with the priority parameter of the highest-priority logical channel of the second interface to determine the interface corresponding to the higher-priority data.

Figure 4:
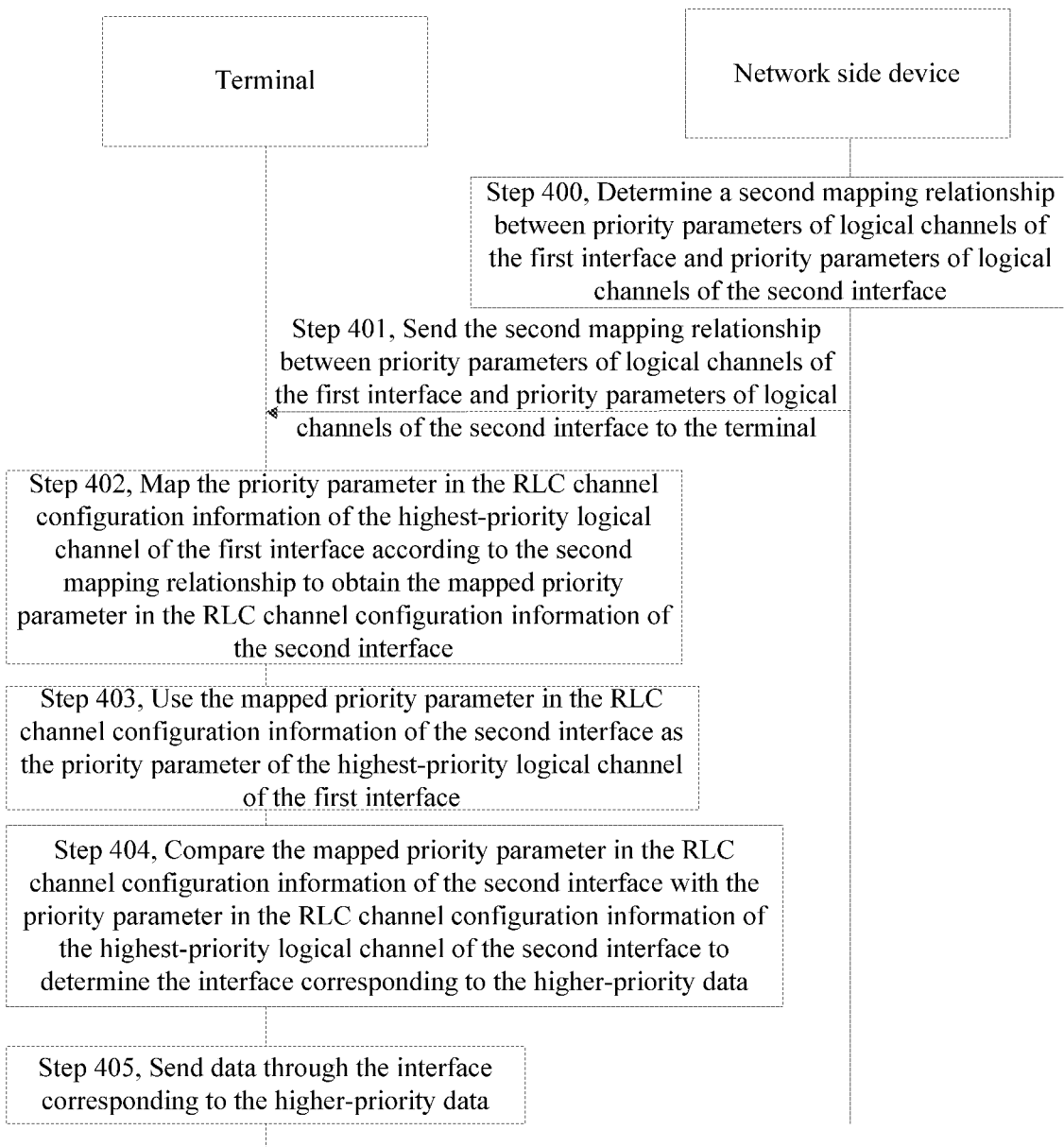
FIG. 4 is a second schematic flowchart of a method for determining an interface corresponding to higher-priority data according to an embodiment of the present application.

As shown in FIG. 4, a second schematic diagram of a method process of comparing the priority parameter of the highest-priority logical channel of the first interface with the priority parameter of the highest-priority logical channel of the second interface to determine the interface corresponding to the higher-priority data according to an embodiment of the present application is illustrated.

Step 400: a network side device determines a second mapping relationship between priority parameters of logical channels of the first interface and priority parameters of logical channels of the second interface.

Step 401: the network side device sends the second mapping relationship between priority parameters of logical channels of the first interface and priority parameters of logical channels of the second interface to a terminal.

Step 402: the terminal maps the priority parameter in the RLC channel configuration information of the highest-priority logical channel of the first interface according to the second mapping relationship to obtain the mapped priority parameter in the RLC channel configuration information of the second interface.

Step 403: the terminal uses the mapped priority parameter in the RLC channel configuration information of the second interface as the priority parameter of the highest-priority logical channel of the first interface.

Step 404: the terminal compares the mapped priority parameter in the RLC channel configuration information of the second interface with the priority parameter in the RLC channel configuration information of the highest-priority logical channel of the second interface to determine the interface corresponding to the higher-priority data.

Step 405: the terminal sends data through the interface corresponding to the higher-priority data.

Case D1: taking the second mapping relationship sent by the network side device as an example, when the priority parameter of the logical channel is the priority level in the QoS parameter, the terminal maps the priority parameter of the highest-priority logical channel of the first interface to the priority parameter of the logical channel of the second interface according to mapping information of the network side device.

Here, the mapping information of the network side device is: the second mapping relationship between priority parameters of logical channels of the first interface and priority parameters of logical channels of the second interface.

The second mapping relationship is the agreement rule of a mapping relationship set in the network side device. For example, the first interface is a direct communication interface and the second interface is a Uu interface, and the second mapping relationship is as shown in Table 4.

TABLE 4

| Priority level in the QoS parameter of Uu interface | Priority level in the QoS parameter of direct communication interface |
|---|---|
| 0-10 | 0 |
| 11-21 | 1 |
| 22-31 | 2 |
| 32-45 | 3 |
| 46-60 | 4 |
| 61-75 | 5 |
| 76-90 | 6 |
| >90 | 7 |

The network side device sends the second mapping relationship between the priority level in the QoS parameter of the first interface and the priority level in the QoS parameter of the second interface to the terminal.

When the terminal has data communication requirements simultaneously on the first interface and the second interface, the terminal maps the priority level in the QoS parameter of the highest-priority logical channel of the first interface according to the second mapping relationship between the priority level in the QoS parameter of the first interface and the priority level in the QoS parameter of the second interface, obtains the mapped priority level in the QoS parameter of the second interface, and uses the mapped priority level in the QoS parameter of the second interface as the priority parameter of the highest-priority logical channel of the first interface.

Further, the terminal compares the priority parameter of the highest-priority logical channel of the first interface with the priority parameter of the highest-priority logical channel of the second interface to determine the interface corresponding to the higher-priority data.

In an embodiment of the present application, when the first interface is a Uu interface and the second interface is a direct communication interface, and when the terminal maps the priority level in the QoS parameter of the Uu interface to the priority level in the QoS parameter of the direct communication interface according to the second mapping relationship between the priority level in the QoS parameter of the first interface and the priority level in the QoS parameter of the second interface, the terminal may also receive the priority level in the QoS parameter corresponding to the highest-priority logical channel of the first interface (Uu interface) configured by the network side.

It should be noted that the method process of the case D1 may refer to the method process of the case C1 in the first way, and the details are not repeated here.

In an embodiment of the present application, when the priority parameter of the logical channel is the priority level in the QoS parameter, if the first interface or the second interface is a direct communication interface, the QoS parameter is a PQI (ProSe QoS Identifier); if the first interface or the second interface is a Uu interface, the QoS parameter is a 5QI (5G QoS Identifier).

In a second way: mapping the priority parameter of the highest-priority logical channel of the second interface to a priority parameter of a logical channel of the first interface, and comparing the priority parameter of the highest-priority logical channel of the first interface with the priority parameter of the highest-priority logical channel of the second interface to determine the interface corresponding to the higher-priority data.

In an embodiment of the present application, when the priority parameter of the highest-priority logical channel of the second interface is mapped to the priority parameter of the logical channel of the first interface, the network side device may be the executing body. The network side device maps the priority parameter of the highest-priority logical channel of the second interface to the priority parameter of the logical channel of the first interface, and sends the mapped priority parameter of the logical channel of the first interface to the terminal as the priority parameter of the highest-priority logical channel of the second interface. Further, the terminal compares the priority parameter of the logical channel of the first interface as the priority parameter of the highest-priority logical channel of the second interface with the priority parameter of the highest-priority logical channel of the first interface, to determine the higher-priority data and thus determine the interface corresponding to the higher-priority data.

Alternatively, the terminal may be the executing body. The terminal maps the priority parameter of the highest-priority logical channel of the second interface to the priority parameter of the logical channel of the first interface according to a first mapping relationship between priority parameters of logical channels of the second interface and priority parameters of logical channels of the first interface configured by the network side device, and uses the mapped priority parameter of the logical channel of the first interface as the priority parameter of the highest-priority logical channel of the second interface. Further, the terminal compares the priority parameter of the logical channel of the first interface as the priority parameter of the highest-priority logical channel of the second interface with the priority parameter of the highest-priority logical channel of the first interface, to determine the higher-priority data and thus determine the interface corresponding to the higher-priority data.

The detailed introduction will be given based on the above content.

I. The Executing Body for Mapping is the Network Side Device.

The network side device maps the priority parameter of the highest-priority logical channel of the second interface to a priority parameter of a logical channel of the first interface and sends the mapped priority parameter of the logical channel of the first interface to the terminal, so that the terminal uses the mapped priority parameter of the logical channel of the first interface received as the priority parameter of the highest-priority logical channel of the second interface.

Here, the priority parameter of the logical channel includes some or all of: a priority level in a QoS parameter; a priority parameter in RLC channel configuration information.

Case A2: when the priority parameter of the logical channel is a priority parameter in the RLC channel configuration information, the terminal maps the priority parameter of the highest-priority logical channel of the second interface to the priority parameter of the logical channel of the first interface according to mapping information of the network side device.

Here, the mapping information of the network side device is: indicating a priority parameter of the first interface corresponding to the highest-priority logical channel of the second interface in the RLC channel configuration information corresponding to the logical channel.

That is, the network side device maps the priority parameter in the RLC channel configuration information of the highest-priority logical channel of the second interface to a priority parameter of the first interface, and sends the mapped priority parameter of the first interface to the terminal as the priority parameter of the highest-priority logical channel of the second interface.

Here, the network side device maps the priority parameter in the RLC channel configuration information of the highest-priority logical channel of the second interface to the priority parameter of the first interface through an agreement rule of a set mapping relationship, which may refer to the case A1 in the first way and will not be repeated here.

The network side device maps the priority parameter in the RLC channel configuration information of the highest-priority logical channel of the second interface, and obtains the priority parameter of the first interface after the mapping.

The network side device indicates the priority parameter of the first interface corresponding to the highest-priority logical channel of the second interface in the RLC channel configuration information corresponding to the logical channel, and sends the priority parameter of the first interface to the terminal.

The terminal receives the priority parameter of the first interface in the RLC channel configuration information corresponding to the highest-priority logical channel of the second interface configured by the network side device, and uses the priority parameter of the first interface in the RLC channel configuration information as the mapped priority parameter of the highest-priority logical channel of the second interface.

Further, the terminal compares the priority parameter of the first interface obtained after mapping the priority parameter in the RLC channel configuration information of the highest-priority logical channel of the second interface with the priority parameter in the RLC channel configuration information of the highest-priority logical channel of the first interface, to determine the higher-priority data and thus determine the interface corresponding to the higher-priority data.

After mapping the priority parameter in the RLC channel configuration information of the highest-priority logical channel of the second interface and obtaining the priority parameter of the first interface after mapping, the priority parameter in the RLC channel configuration information of the highest-priority logical channel of the second interface is represented by the priority parameter of the first interface obtained after mapping, so the priority of the mapped priority parameter of the highest-priority logical channel of the second interface may be directly compared with the priority of the priority parameter in the RLC channel configuration information of the highest-priority logical channel of the first interface to determine the higher priority.

It should be noted that the method process of the case A2 in the second way may refer to the method process of the case A1 in the first way, and the details are not repeated here.

Case B2: when the priority parameter of the logical channel is the priority level in the QoS parameter, the terminal maps the priority parameter of the highest-priority logical channel of the second interface to the priority parameter of the logical channel of the first interface according to mapping information of the network side device.

Here, the mapping information of the network side device is: indicating the priority level in the QoS parameter of the first interface corresponding to the highest-priority logical channel of the second interface in the RLC channel configuration information corresponding to the logical channel.

That is, the network side device maps the priority level in the QoS parameter of the highest-priority logical channel of the second interface to the priority level in the QoS parameter of the first interface, and uses the mapped priority level in the QoS parameter of the first interface as the priority parameter of the highest-priority logical channel of the second interface.

Here, the network side device maps the priority level in the QoS parameter of the highest-priority logical channel of the second interface to the priority level in the QoS parameter of the first interface through an agreement rule of a set mapping relationship, which may refer to the case B1 in the first way and will not be repeated here.

The network side device maps the priority level in the QoS parameter of the highest-priority logical channel of the second interface, and obtains the priority level in the QoS parameter of the first interface after the mapping.

The network side device indicates the priority level in the QoS parameter of the first interface corresponding to the highest-priority logical channel of the second interface in the RLC channel configuration information corresponding to the logical channel, and sends the priority level in the QoS parameter of the first interface to the terminal.

The terminal receives the priority level in the QoS parameter of the first interface in the RLC channel configuration information corresponding to the highest-priority logical channel of the second interface configured by the network side device, and uses the priority level in the QoS parameter of the first interface in the RLC channel configuration information as the mapped priority parameter of the highest-priority logical channel of the second interface.

Further, the terminal compares the priority level in the QoS parameter of the first interface obtained after mapping the priority level in the QoS parameter of the highest-priority logical channel of the second interface with the priority level in the QoS parameter of the highest-priority logical channel of the first interface, to determine the higher-priority data and thus determine the interface corresponding to the higher-priority data.

After mapping the priority level in the QoS parameter of the highest-priority logical channel of the second interface and obtaining the priority level in the QoS parameter of the first interface after mapping, the priority level in the QoS parameter of the highest-priority logical channel of the second interface is represented by the priority level in the QoS parameter of the first interface obtained after mapping, so the priority of the mapped priority parameter of the highest-priority logical channel of the second interface may be directly compared with the priority level in the QoS parameter of the highest-priority logical channel of the first interface to determine the higher priority.

It should be noted that the method process of the case B2 in the second way may refer to the method process of the case A1 in the first way, and the details are not repeated here.

In an embodiment of the present application, when the priority parameter of the logical channel is the priority level in the QoS parameter, if the first interface or the second interface is a direct communication interface, the QoS parameter is a PQI (ProSe QoS Identifier); if the first interface or the second interface is a Uu interface, the QoS parameter is a 5QI (5G QoS Identifier).

II. The Executing Body for Mapping is the Terminal.

The terminal maps the priority parameter of the highest-priority logical channel of the second interface according to a first mapping relationship between priority parameters of logical channels of the second interface and priority parameters of logical channels of the first interface to obtain the priority parameter of the logical channel of the first interface after the mapping, and uses the mapped priority parameter as the priority parameter of the highest-priority logical channel of the second interface.

Here, the first mapping relationship between priority parameters of logical channels of the second interface and priority parameters of logical channels of the first interface is sent by the network side device to the terminal through broadcast or dedicated signaling, or is determined by the terminal according to protocol stipulation or pre-configuration.

Here, the priority parameter of the logical channel includes: a priority level in a QoS parameter; a priority parameter in RLC channel configuration information.

Case C2: taking the first mapping relationship sent by the network side device as an example, when the priority parameter of the logical channel is a priority parameter in the RLC channel configuration information, the terminal maps the priority parameter of the highest-priority logical channel of the second interface to the priority parameter of the logical channel of the first interface according to mapping information of the network side device.

Here, the mapping information of the network side device is: the first mapping relationship between priority parameters of logical channels of the second interface and priority parameters of logical channels of the first interface.

The first mapping relationship is the agreement rule of a mapping relationship set in the network side device, which may refer to the case C1 in the first way.

The network side device sends the first mapping relationship between priority parameters in the RLC channel configuration information of the second interface and priority parameters in the RLC channel configuration information of the first interface to the terminal.

When the terminal has data communication requirements simultaneously on the second interface and the first interface, the terminal maps the priority parameter in the RLC channel configuration information of the highest-priority logical channel of the second interface according to the first mapping relationship between priority parameters in the RLC channel configuration information of the second interface and priority parameters in the RLC channel configuration information of the first interface, obtains the mapped priority parameter in the RLC channel configuration information of the first interface, and then uses the mapped priority parameter in the RLC channel configuration information of the first interface as the priority parameter of the highest-priority logical channel of the second interface.

Further, the terminal compares the priority parameter of the highest-priority logical channel of the second interface with the priority parameter of the highest-priority logical channel of the first interface to determine the interface corresponding to the higher-priority data.

It should be noted that the method process of the case C2 in the second way may refer to the method process of the case C1 in the first way, and the details are not repeated here.

Case D2: taking the first mapping relationship sent by the network side device as an example, when the priority parameter of the logical channel is the priority level in the QoS parameter, the terminal maps the priority parameter of the highest-priority logical channel of the second interface to the priority parameter of the logical channel of the first interface according to mapping information of the network side device.

Here, the mapping information of the network side device is: the first mapping relationship between priority parameters of logical channels of the second interface and priority parameters of logical channels of the first interface.

The first mapping relationship is the agreement rule of a mapping relationship set in the network side device, which may refer to the case D1 in the first way.

The network side device sends the first mapping relationship between the priority level in the QoS parameter of the second interface and the priority level in the QoS parameter of the first interface to the terminal.

When the terminal has data communication requirements simultaneously on the second interface and the first interface, the terminal maps the priority level in the QoS parameter of the highest-priority logical channel of the second interface according to the first mapping relationship between the priority level in the QoS parameter of the second interface and the priority level in the QoS parameter of the first interface, obtains the mapped priority level in the QoS parameter of the first interface, and uses the mapped priority level in the QoS parameter of the first interface as the priority parameter of the highest-priority logical channel of the second interface.

Further, the terminal compares the priority parameter of the highest-priority logical channel of the second interface with the priority parameter of the highest-priority logical channel of the first interface to determine the interface corresponding to the higher-priority data.

In an embodiment of the present application, when the second interface is a Uu interface and the first interface is a direct communication interface, and when the terminal maps the priority level in the QoS parameter of the Uu interface to the priority level in the QoS parameter of the direct communication interface according to the first mapping relationship between the priority level in the QoS parameter of the second interface and the priority level in the QoS parameter of the first interface, the terminal may also receive the priority level in the QoS parameter corresponding to the highest-priority logical channel of the second interface (Uu interface) configured by the network side.

It should be noted that the method process of the case D2 may refer to the method process of the case C1 in the first way, and the details are not repeated here.

In an embodiment of the present application, when the priority parameter of the logical channel is the priority level in the QoS parameter, if the first interface or the second interface is a direct communication interface, the QoS parameter is a PQI (ProSe QoS Identifier); if the first interface or the second interface is a Uu interface, the QoS parameter is a 5QI (5G QoS Identifier).

In a third way: comparing the priority parameter of the highest-priority logical channel of the first interface with a first preset threshold, and determining the interface corresponding to the higher-priority data to be the first interface when the value of the priority parameter is lower than the first preset threshold.

For example, the priority parameter of the highest-priority logical channel of the first interface is 4, and the first preset threshold is 5. The priority parameter of the highest-priority logical channel of the first interface is lower than the first preset threshold, so it is determined that the priority of the highest-priority data of the first interface is higher than the priority of the highest-priority data of the second interface, the interface corresponding to the higher-priority data is further determined to be the first interface, and the data is sent through the first interface.

In a fourth way: comparing the priority parameter of the highest-priority logical channel of the second interface with a second preset threshold, and determining the interface corresponding to the higher-priority data to be the second interface when the value of the priority parameter is lower than the second preset threshold.

For example, the priority parameter of the highest-priority logical channel of the second interface is 4, and the second preset threshold is 5. The priority parameter of the highest-priority logical channel of the second interface is lower than the second preset threshold, so it is determined that the priority of the highest-priority data of the second interface is higher than the priority of the highest-priority data of the first interface, the interface corresponding to the higher-priority data is further determined to be the second interface, and the data is sent through the second interface.

In a fifth way: comparing the priority parameter of the highest-priority logical channel of the first interface directly with the priority parameter of the highest-priority logical channel of the second interface to determine the interface corresponding to the higher-priority data.

In an embodiment of the present application, the common control channel is a channel for communicating control information before an RRC (Radio Resource Control) connection is established, e.g., a channel for communicating messages such as a RRC connection establishment request and a RRC connection re-establishment request, such as CCCH (Common Control Channel).

In an embodiment of the present application, when the highest-priority data of the first interface and the highest-priority data of the second interface are both the data from the common control channel, it is also possible to map the priority parameter of the highest-priority logical channel of the first interface to a priority parameter of a logical channel of the second interface by using the pre-configuration method and/or map the priority parameter of the highest-priority logical channel of the second interface to a priority parameter of a logical channel of the first interface by using the pre-configuration method in a case when the highest-priority logical channel of the first interface is the logical channel corresponding to SRB0 and/or the highest-priority logical channel of the second interface is the logical channel corresponding to SRB0.

Figure 5:
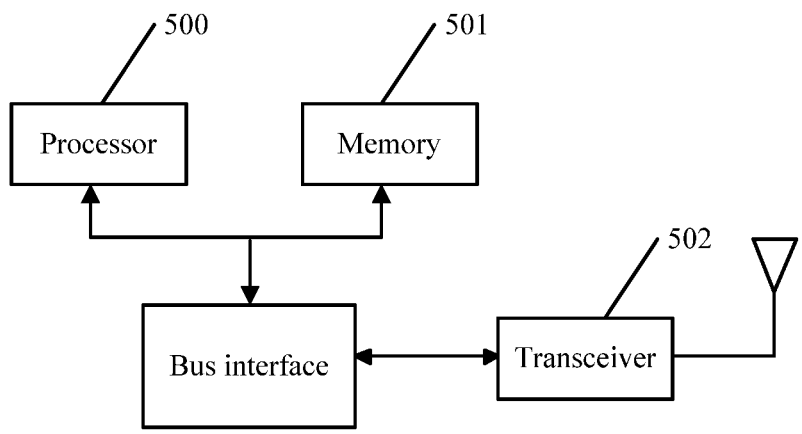
FIG. 5 is a first structural schematic diagram of a terminal for data communication according to an embodiment of the present application.

As shown in FIG. 5, it is a first structural diagram of a terminal according to an embodiment of the present application. The terminal is a terminal that does not support data communication simultaneously at first and second interfaces, and the terminal includes: a processor 500, a memory 501 and a transceiver 502.

The processor 500 is responsible for managing the bus architecture and general processing, and the memory 501 may store the data used by the processor 500 when performing the operations. The transceiver 502 is configured to receive and send the data under the control of the processor 500.

The bus architecture may include any quantities of interconnected buses and bridges, and link various circuits of one or more processors represented by the processor 500 and the memory represented by the memory 501. The bus architecture may further link various other circuits such as a peripheral device, a voltage regulator and a power management circuit, which are all well known in the art and thus will not be further described again herein. The bus interface provides an interface. The processor 500 is responsible for managing the bus architecture and general processing, and the memory 501 may store the data used by the processor 500 when performing the operations.

The operation flow disclosed by embodiments of the present application may be applied in the processor 500 or implemented by the processor 500. In an implementation process, each step of the signal processing flow may be completed by the integrated logic circuit of hardware in the processor 500 or by the instruction in the form of software. The processor 500 may be a general-purpose processor, a digital signal processor, an application specific integrated circuit, a field programmable gate array or other programmable logic devices, a discrete gate or a transistor logic device, or a discrete hardware component, and may implement or perform each method, step and logical block diagram disclosed in embodiments of the present application. The general-purpose processor may be a microprocessor or any conventional processor or the like. The steps of the method disclosed in combination with embodiments of the present application may be directly completed by a hardware processor, or completed by a combination of hardware and software modules in the processor. The software modules may be located in a random access memory, a flash memory, a read only memory, a programmable read only memory or an electrically erasable programmable read only memory, a register and other mature storage mediums in the art. The storage medium is located in the memory 501, and the processor 500 reads the information in the memory 501 and completes the steps of the signal processing flow in combination with its hardware.

Here, the processor 500 is configured to read a program in the memory 501 and perform: determining highest-priority data of each of the first and second interfaces respectively when there are data communication requirements simultaneously at the first and second interfaces; comparing a priority of the highest-priority data of the first interface with a priority of the highest-priority data of the second interface to determine an interface corresponding to higher-priority data; sending data through the determined interface.

Optionally, when the highest-priority data of the first interface and the highest-priority data of the second interface are different types of data, the processor 500 is configured to: determine the interface corresponding to higher-priority data in a following priority order; where the priority order is: a priority of data from common control channel and/or MAC CE for carrying important control information is higher than a priority of data from logical channels other than the common control channel and/or physical layer control information; the priority of data from logical channels other than the common control channel and/or physical layer control information is higher than a priority of MAC CE for carrying unimportant control information.

Optionally, when the highest-priority data of the first interface and the highest-priority data of the second interface are a same type of data, the processor 500 is configured to: determine the interface corresponding to higher-priority data according to one of network configuration, protocol stipulation, pre-configuration or randomization when the highest-priority data of each of the first and second interfaces determined respectively are both data from common control channel and/or MAC CE for carrying important control information; or determine the interface corresponding to higher-priority data according to one of network configuration, protocol stipulation, pre-configuration or randomization when the highest-priority data of each of the first and second interfaces determined respectively are both MAC CE for carrying unimportant control information; or compare a priority parameter of a highest-priority logical channel of the first interface with a priority parameter of a highest-priority logical channel of the second interface to determine the interface corresponding to higher-priority data when the highest-priority data of each of the first and second interfaces determined respectively are both data from logical channels other than the common control channel and/or physical layer control information.

Optionally, the MAC CE for carrying important control information includes some or all of: C-RNTI MAC CE; Configured Grant Confirmation MAC CE; BSR MAC CE other than Padding BSR MAC CE; PHR MAC CE, including but not limited to: Single Entry PHR MAC CE or Multiple Entry PHR MAC CE.

Optionally, the MAC CE for carrying unimportant control information includes some or all of: Recommended bit rate query MAC CE; Padding BSR MAC CE; Sidelink BSR MAC CE.

Optionally, when the highest-priority data is physical layer control information, the highest-priority logical channel is one of: the highest-priority logical channel is a logical channel triggering an SR when the physical layer control information is the SR; the highest-priority logical channel is a highest-priority logical channel contained in a TB corresponding to an HARQ feedback when the physical layer control information is the HARQ feedback; the highest-priority logical channel is a highest-priority logical channel on which the terminal currently has data to be sent when the physical layer control information is CSI.

Optionally, the priority parameter of the logical channel includes some or all of: a priority level in a QoS parameter; a priority parameter in RLC channel configuration information.

Optionally, the processor 500 is configured to: map the priority parameter of the highest-priority logical channel of the first interface to a priority parameter of a logical channel of the second interface, and compare the priority parameter of the highest-priority logical channel of the first interface with the priority parameter of the highest-priority logical channel of the second interface to determine the interface corresponding to higher-priority data; or map the priority parameter of the highest-priority logical channel of the second interface to a priority parameter of a logical channel of the first interface, and compare the priority parameter of the highest-priority logical channel of the first interface with the priority parameter of the highest-priority logical channel of the second interface to determine the interface corresponding to higher-priority data; or compare the priority parameter of the highest-priority logical channel of the first interface with a first preset threshold, and determine the interface corresponding to higher-priority data to be the first interface when a value of the priority parameter is lower than the first preset threshold; or compare the priority parameter of the highest-priority logical channel of the second interface with a second preset threshold, and determine the interface corresponding to higher-priority data to be the second interface when a value of the priority parameter is lower than the second preset threshold; or compare the priority parameter of the highest-priority logical channel of the first interface directly with the priority parameter of the highest-priority logical channel of the second interface to determine the interface corresponding to higher-priority data.

Optionally, the priority parameter of the logical channel includes a priority parameter in RLC channel configuration information, and the processor 500 is configured to: receive a priority parameter of the first interface in RLC channel configuration information corresponding to the highest-priority logical channel of the second interface configured by a network side device, and use the priority parameter of the first interface as the mapped priority parameter of the highest-priority logical channel of the second interface.

Optionally, the priority parameter of the logical channel includes a priority parameter in RLC channel configuration information, and the processor 500 is configured to: receive a priority parameter of the second interface in RLC channel configuration information corresponding to the highest-priority logical channel of the first interface configured by the network side device, and use the priority parameter of the second interface as the mapped priority parameter of the highest-priority logical channel of the first interface.

Optionally, the priority parameter of the logical channel includes a priority level in a QoS parameter, and the processor 500 is configured to: receive a priority level in a QoS parameter of the first interface in RLC channel configuration information corresponding to the highest-priority logical channel of the second interface configured by a network side device, and use the priority level in the QoS parameter of the first interface as the mapped priority parameter of the highest-priority logical channel of the second interface.

Optionally, the priority parameter of the logical channel includes a priority level in a QoS parameter, and the processor 500 is configured to: receive a priority level in a QoS parameter of the second interface in RLC channel configuration information corresponding to the highest-priority logical channel of the first interface configured by a network side device, and use the priority level in the QoS parameter of the second interface as the mapped priority parameter of the highest-priority logical channel of the first interface.

Optionally, the processor 500 is configured to: map the priority parameter of the highest-priority logical channel of the second interface according to a first mapping relationship between priority parameters of logical channels of the second interface and priority parameters of logical channels of the first interface to obtain the mapped priority parameter of the logical channel of the first interface, and use the mapped priority parameter as the priority parameter of the highest-priority logical channel of the second interface.

Optionally, the processor 500 is configured to: map the priority parameter of the highest-priority logical channel of the first interface according to a second mapping relationship between priority parameters of logical channels of the first interface and priority parameters of logical channels of the second interface to obtain the mapped priority parameter of the logical channel of the second interface, and use the mapped priority parameter as the priority parameter of the highest-priority logical channel of the first interface.

Optionally, the first interface is a direct communication interface, the second interface is a Uu interface, the priority parameter of the logical channel is a priority level in a QoS parameter, and the processor 500 is configured to: receive a priority level in a QoS parameter corresponding to the highest-priority logical channel of the second interface configured by a network side, map the priority level in the QoS parameter of the second interface to a priority level in a QoS parameter of the first interface according to the first mapping relationship, and use the priority level in the QoS parameter of the first interface as the mapped priority parameter of the highest-priority logical channel of the second interface.

Optionally, the first interface is a direct communication interface, the second interface is a Uu interface, the priority parameter of the logical channel is a priority level in a QoS parameter, and the processor 500 is configured to: map a priority level in a QoS parameter of the first interface to a priority level in a QoS parameter of the second interface according to the second mapping relationship, and use the priority level in the QoS parameter of the second interface as the mapped priority parameter of the highest-priority logical channel of the first interface.

Optionally, the first interface is a Uu interface, the second interface is a direct communication interface, the priority parameter of the logical channel is a priority level in a QoS parameter, and the processor 500 is configured to: map a priority level in a QoS parameter of the second interface to a priority level in a QoS parameter of the first interface according to the first mapping relationship, and use the priority level in the QoS parameter of the first interface as the mapped priority parameter of the highest-priority logical channel of the second interface.

Optionally, the first interface is a Uu interface, the second interface is a direct communication interface, the priority parameter of the logical channel is a priority level in a QoS parameter, and the processor 500 is configured to: receive a priority level in a QoS parameter corresponding to the highest-priority logical channel of the first interface configured by a network side, map the priority level in the QoS parameter of the first interface to a priority level in a QoS parameter of the second interface according to the second mapping relationship, and use the priority level in the QoS parameter of the second interface as the mapped priority parameter of the highest-priority logical channel of the first interface.

Optionally, the priority parameter of the logical channel is a priority parameter in RLC channel configuration information, and the processor 500 is configured to: map a priority parameter in RLC channel configuration information of the second interface to a priority parameter in RLC channel configuration information of the first interface according to the first mapping relationship, and use the priority parameter in the RLC channel configuration information of the first interface as the mapped priority parameter of the highest-priority logical channel of the second interface.

Optionally, the priority parameter of the logical channel is a priority parameter in RLC channel configuration information, and the processor 500 is configured to: map a priority parameter in RLC channel configuration information of the first interface to a priority parameter in RLC channel configuration information of the second interface according to the second mapping relationship, and use the priority parameter in the RLC channel configuration information of the second interface as the mapped priority parameter of the highest-priority logical channel of the first interface.

Optionally, the processor 500 determines the first mapping relationship by: determining the first mapping relationship through some or all of broadcast of the network side device, dedicated signaling of the network side device, protocol agreement or pre-configuration.

Optionally, the processor 500 determines the second mapping relationship by: determining the second mapping relationship through some or all of broadcast of the network side device, dedicated signaling of the network side device, protocol agreement or pre-configuration.

Optionally, when the first interface is a direct communication interface, the second interface is a Uu interface; or when the first interface is a Uu interface, the second interface is a direct communication interface.

Figure 6:
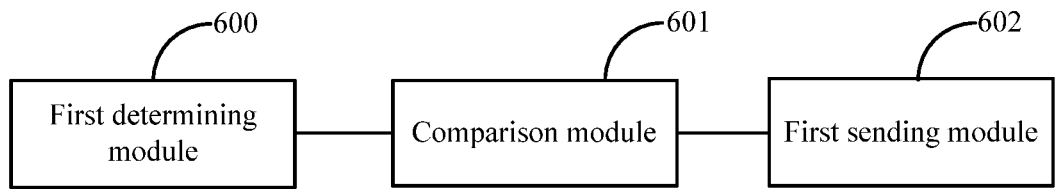
FIG. 6 is a second structural schematic diagram of a terminal for data communication according to an embodiment of the present application.

As shown in FIG. 6, it is a second structural diagram of a terminal according to an embodiment of the present application. The terminal includes: a first determining module 600, a comparison module 601, and a first sending module 602.

The first determining module 600 is configured to: determine highest-priority data of each of the first and second interfaces respectively when there are data communication requirements simultaneously at the first and second interfaces.

The comparison module 601 is configured to: compare a priority of the highest-priority data of the first interface with a priority of the highest-priority data of the second interface to determine an interface corresponding to higher-priority data.

The first sending module 602 is configured to: send data through the determined interface.

Optionally, when the highest-priority data of the first interface and the highest-priority data of the second interface are different types of data, the comparison module 601 is configured to: determine the interface corresponding to higher-priority data in a following priority order; where the priority order is: a priority of data from common control channel and/or MAC CE for carrying important control information is higher than a priority of data from logical channels other than the common control channel and/or physical layer control information; the priority of data from logical channels other than the common control channel and/or physical layer control information is higher than a priority of MAC CE for carrying unimportant control information.

Optionally, when the highest-priority data of the first interface and the highest-priority data of the second interface are a same type of data, the comparison module 601 is configured to: determine the interface corresponding to higher-priority data according to one of network configuration, protocol stipulation, pre-configuration or randomization when the highest-priority data of each of the first and second interfaces determined respectively are both data from common control channel and/or MAC CE for carrying important control information; or determine the interface corresponding to higher-priority data according to one of network configuration, protocol stipulation, pre-configuration or randomization when the highest-priority data of each of the first and second interfaces determined respectively are both MAC CE for carrying unimportant control information; or compare a priority parameter of a highest-priority logical channel of the first interface with a priority parameter of a highest-priority logical channel of the second interface to determine the interface corresponding to higher-priority data when the highest-priority data of each of the first and second interfaces determined respectively are both data from logical channels other than the common control channel and/or physical layer control information.

Optionally, the MAC CE for carrying important control information includes some or all of: C-RNTI MAC CE; Configured Grant Confirmation MAC CE; BSR MAC CE other than Padding BSR MAC CE; PHR MAC CE, including but not limited to: Single Entry PHR MAC CE or Multiple Entry PHR MAC CE.

Optionally, the MAC CE for carrying unimportant control information includes some or all of: Recommended bit rate query MAC CE; Padding BSR MAC CE; Sidelink BSR MAC CE.

Optionally, when the highest-priority data is physical layer control information, the highest-priority logical channel is one of: the highest-priority logical channel is a logical channel triggering an SR when the physical layer control information is the SR; the highest-priority logical channel is a highest-priority logical channel contained in a TB corresponding to an HARQ feedback when the physical layer control information is the HARQ feedback; the highest-priority logical channel is a highest-priority logical channel on which the terminal currently has data to be sent when the physical layer control information is CSI.

Optionally, the priority parameter of the logical channel includes some or all of: a priority level in a QoS parameter; a priority parameter in RLC channel configuration information.

Optionally, the comparison module 601 is configured to: map the priority parameter of the highest-priority logical channel of the first interface to a priority parameter of a logical channel of the second interface, and compare the priority parameter of the highest-priority logical channel of the first interface with the priority parameter of the highest-priority logical channel of the second interface to determine the interface corresponding to higher-priority data; or map the priority parameter of the highest-priority logical channel of the second interface to a priority parameter of a logical channel of the first interface, and compare the priority parameter of the highest-priority logical channel of the first interface with the priority parameter of the highest-priority logical channel of the second interface to determine the interface corresponding to higher-priority data; or compare the priority parameter of the highest-priority logical channel of the first interface with a first preset threshold, and determine the interface corresponding to higher-priority data to be the first interface when a value of the priority parameter is lower than the first preset threshold; or compare the priority parameter of the highest-priority logical channel of the second interface with a second preset threshold, and determine the interface corresponding to higher-priority data to be the second interface when a value of the priority parameter is lower than the second preset threshold; or compare the priority parameter of the highest-priority logical channel of the first interface directly with the priority parameter of the highest-priority logical channel of the second interface to determine the interface corresponding to higher-priority data.

Optionally, the priority parameter of the logical channel includes a priority parameter in RLC channel configuration information; and the comparison module 601 is configured to: receive a priority parameter of the first interface in RLC channel configuration information corresponding to the highest-priority logical channel of the second interface configured by a network side device, and use the priority parameter of the first interface as the mapped priority parameter of the highest-priority logical channel of the second interface.

Optionally, the priority parameter of the logical channel includes a priority parameter in RLC channel configuration information; and the comparison module 601 is configured to: receive a priority parameter of the second interface in RLC channel configuration information corresponding to the highest-priority logical channel of the first interface configured by the network side device, and use the priority parameter of the second interface as the mapped priority parameter of the highest-priority logical channel of the first interface.

Optionally, the priority parameter of the logical channel is a priority level in a QoS parameter; and the comparison module 601 is configured to: receive a priority level in a QoS parameter of the first interface in RLC channel configuration information corresponding to the highest-priority logical channel of the second interface configured by a network side device, and use the priority level in the QoS parameter of the first interface as the mapped priority parameter of the highest-priority logical channel of the second interface.

Optionally, the priority parameter of the logical channel is a priority level in a QoS parameter; and the comparison module 601 is configured to: receive a priority level in a QoS parameter of the second interface in RLC channel configuration information corresponding to the highest-priority logical channel of the first interface configured by the network side device, and use the priority level in the QoS parameter of the second interface as the mapped priority parameter of the highest-priority logical channel of the first interface.

Optionally, the comparison module 601 is configured to: map the priority parameter of the highest-priority logical channel of the second interface according to a first mapping relationship between priority parameters of logical channels of the second interface and priority parameters of logical channels of the first interface to obtain the mapped priority parameter of the logical channel of the first interface, and use the mapped priority parameter as the priority parameter of the highest-priority logical channel of the second interface; or map the priority parameter of the highest-priority logical channel of the first interface according to a second mapping relationship between priority parameters of logical channels of the first interface and priority parameters of logical channels of the second interface to obtain the mapped priority parameter of the logical channel of the second interface, and use the mapped priority parameter as the priority parameter of the highest-priority logical channel of the first interface.

Optionally, the first interface is a direct communication interface, the second interface is a Uu interface, the priority parameter of the logical channel is a priority level in a QoS parameter, and the comparison module 601 is configured to: receive a priority level in a QoS parameter corresponding to the highest-priority logical channel of the second interface configured by a network side, map the priority level in QoS parameter of the second interface to a priority level in a QoS parameter of the first interface according to the first mapping relationship, and use the priority level in the QoS parameter of the first interface as the mapped priority parameter of the highest-priority logical channel of the second interface.

Optionally, the first interface is a direct communication interface, the second interface is a Uu interface, the priority parameter of the logical channel is a priority level in a QoS parameter, and the comparison module 601 is configured to: map a priority level in a QoS parameter of the first interface to a priority level in a QoS parameter of the second interface according to the second mapping relationship, and use the priority level in the QoS parameter of the second interface as the mapped priority parameter of the highest-priority logical channel of the first interface.

Optionally, the first interface is a Uu interface, the second interface is a direct communication interface, the priority parameter of the logical channel is a priority level in a QoS parameter, and the comparison module 601 is configured to: map a priority level in a QoS parameter of the second interface to a priority level in a QoS parameter of the first interface according to the first mapping relationship, and use the priority level in the QoS parameter of the first interface as the mapped priority parameter of the highest-priority logical channel of the second interface.

Optionally, the first interface is a Uu interface, the second interface is a direct communication interface, the priority parameter of the logical channel is a priority level in a QoS parameter, and the comparison module 601 is configured to: receive a priority level in a QoS parameter corresponding to the highest-priority logical channel of the first interface configured by a network side, map the priority level in the QoS parameter of the first interface to a priority level in a QoS parameter of the second interface according to the second mapping relationship, and use the priority level in the QoS parameter of the second interface as the mapped priority parameter of the highest-priority logical channel of the first interface.

Optionally, the priority parameter of the logical channel is a priority parameter in RLC channel configuration information; and the comparison module 601 is configured to: map a priority parameter in RLC channel configuration information of the second interface to a priority parameter in RLC channel configuration information of the first interface according to the first mapping relationship, and use the priority parameter in the RLC channel configuration information of the first interface as the mapped priority parameter of the highest-priority logical channel of the second interface.

Optionally, the priority parameter of the logical channel is a priority parameter in RLC channel configuration information; and the comparison module 601 is configured to: map a priority parameter in RLC channel configuration information of the first interface to a priority parameter in RLC channel configuration information of the second interface according to the second mapping relationship, and use the priority parameter in the RLC channel configuration information of the second interface as the mapped priority parameter of the highest-priority logical channel of the first interface.

Optionally, the comparison module 601 determines the first mapping relationship by: determining the first mapping relationship through some or all of broadcast of the network side device, dedicated signaling of the network side device, protocol agreement or pre-configuration.

Optionally, the comparison module 601 determines the second mapping relationship by: determining the second mapping relationship through some or all of broadcast of the network side device, dedicated signaling of the network side device, protocol agreement or pre-configuration.

Optionally, when the first interface is a direct communication interface, the second interface is a Uu interface; or when the first interface is a Uu interface, the second interface is a direct communication interface.

Figure 7:
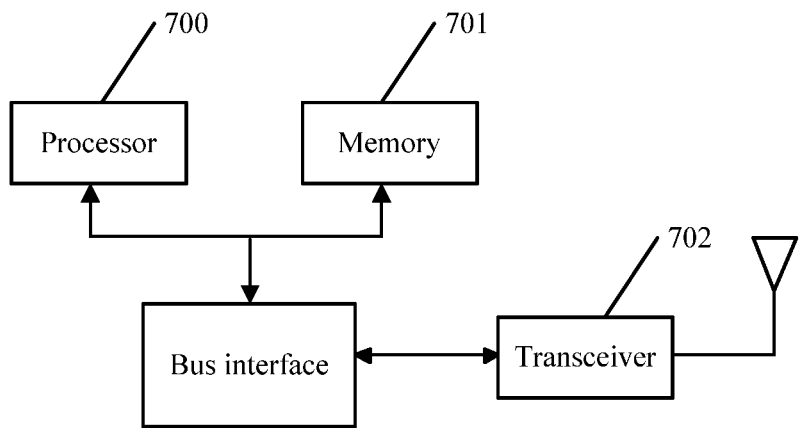
FIG. 7 is a first structural schematic diagram of a network side device for data communication according to an embodiment of the present application.

As shown in FIG. 7, it is a first structural diagram of a network side device according to an embodiment of the present application. The network side device includes: a processor 700, a memory 701 and a transceiver 702.

The processor 700 is responsible for managing the bus architecture and general processing, and the memory 701 may store the data used by the processor 700 when performing the operations. The transceiver 702 is configured to receive and send the data under the control of the processor 700.

The bus architecture may include any quantities of interconnected buses and bridges, and link various circuits of one or more processors represented by the processor 700 and the memory represented by the memory 701. The bus architecture may further link various other circuits such as a peripheral device, a voltage regulator and a power management circuit, which are all well known in the art and thus will not be further described again herein. The bus interface provides an interface. The processor 700 is responsible for managing the bus architecture and general processing, and the memory 701 may store the data used by the processor 700 when performing the operations.

The operation flow disclosed by embodiments of the present application may be applied in the processor 700 or implemented by the processor 700. In an implementation process, each step of the signal processing flow may be completed by the integrated logic circuit of hardware in the processor 700 or by the instruction in the form of software. The processor 700 may be a general-purpose processor, a digital signal processor, an application specific integrated circuit, a field programmable gate array or other programmable logic devices, a discrete gate or a transistor logic device, or a discrete hardware component, and may implement or perform each method, step and logical block diagram disclosed in embodiments of the present application. The general-purpose processor may be a microprocessor or any conventional processor or the like. The steps of the method disclosed in combination with embodiments of the present application may be directly completed by a hardware processor, or completed by a combination of hardware and software modules in the processor. The software modules may be located in a random access memory, a flash memory, a read only memory, a programmable read only memory or an electrically erasable programmable read only memory, a register and other mature storage mediums in the art. The storage medium is located in the memory 701, and the processor 700 reads the information in the memory 701 and completes the steps of the signal processing flow in combination with its hardware.

Here, the processor 700 is configured to read a program in the memory 701 and perform: determining mapping information; sending the mapping information to a terminal, so that the terminal that does not support data communication simultaneously at first and second interfaces determines highest-priority data of each of the first and second interfaces respectively when the terminal has data communication requirements simultaneously at the first and second interfaces and compares a priority of the highest-priority data of the first interface with a priority of the highest-priority data of the second interface according to the mapping information to determine an interface corresponding to higher-priority data.

Optionally, the mapping information includes some or all of: indicating a priority parameter of the first interface corresponding to a highest-priority logical channel of the second interface in RLC channel configuration information corresponding to the logical channel; indicating a priority parameter of the second interface corresponding to a highest-priority logical channel of the first interface in RLC channel configuration information corresponding to the logical channel; indicating a priority level of a QoS parameter of the first interface corresponding to the highest-priority logical channel of the second interface in RLC channel configuration information corresponding to the logical channel; indicating a priority level of a QoS parameter of the second interface corresponding to the highest-priority logical channel of the first interface in RLC channel configuration information corresponding to the logical channel; a first mapping relationship between priority parameters of logical channels of the second interface and priority parameters of logical channels of the first interface; a second mapping relationship between priority parameters of logical channels of the first interface and priority parameters of logical channels of the second interface.

Optionally, when the mapping information includes the first mapping relationship, the processor 700 is configured to: send the first mapping relationship to the terminal through broadcast or dedicated signaling.

Optionally, when the mapping information includes the second mapping relationship, the processor 700 is configured to: send the second mapping relationship to the terminal through broadcast or dedicated signaling.

Optionally, when the first interface is a direct communication interface, the second interface is a Uu interface; or when the first interface is a Uu interface, the second interface is a direct communication interface.

Figure 8:
FIG. 8 is a second structural schematic diagram of a network side device for data communication according to an embodiment of the present application.

As shown in FIG. 8, it is a second structural diagram of a network side device according to an embodiment of the present application. The network side device includes: a second determining module 800 and a second sending module 801.

The second determining module 800 is configured to: determine mapping information.

The second sending module 801 is configured to: send the mapping information to a terminal, so that the terminal that does not support data communication simultaneously at first and second interfaces determines highest-priority data of each of the first and second interfaces respectively when the terminal has data communication requirements simultaneously at the first and second interfaces and compares a priority of the highest-priority data of the first interface with a priority of the highest-priority data of the second interface according to the mapping information to determine an interface corresponding to higher-priority data.

Optionally, the mapping information includes some or all of: indicating a priority parameter of the first interface corresponding to a highest-priority logical channel of the second interface in RLC channel configuration information corresponding to the logical channel; indicating a priority parameter of the second interface corresponding to a highest-priority logical channel of the first interface in RLC channel configuration information corresponding to the logical channel; indicating a priority level of a QoS parameter of the first interface corresponding to the highest-priority logical channel of the second interface in RLC channel configuration information corresponding to the logical channel; indicating a priority level of a QoS parameter of the second interface corresponding to the highest-priority logical channel of the first interface in RLC channel configuration information corresponding to the logical channel; a first mapping relationship between priority parameters of logical channels of the second interface and priority parameters of logical channels of the first interface; a second mapping relationship between priority parameters of logical channels of the first interface and priority parameters of logical channels of the second interface.

Optionally, when the mapping information includes the first mapping relationship, the second sending module 801 is configured to: send the first mapping relationship to the terminal through broadcast or dedicated signaling.

Optionally, when the mapping information includes the second mapping relationship, the second sending module 801 is configured to: send the second mapping relationship to the terminal through broadcast or dedicated signaling.

Optionally, when the first interface is a direct communication interface, the second interface is a Uu interface; or when the first interface is a Uu interface, the second interface is a direct communication interface.

An embodiment of the present application provides a readable storage medium that is a non-transitory readable storage medium and includes program codes. When the program codes run on a computing device, the program codes are configured to cause the computing device to perform the data communication solution of the terminal described above.

An embodiment of the present application provides a readable storage medium that is a non-transitory readable storage medium and includes program codes. When the program codes run on a computing device, the program codes are configured to cause the computing device to perform the data communication solution of the network side device described above.

An embodiment of the present application provides a computer program product containing instructions, which cause a computer to perform the data communication solution of the terminal described above when running on the computer.

An embodiment of the present application provides a computer program product containing instructions, which cause a computer to perform the data communication solution of the network side device described above when running on the computer.

Based on the same inventive concept, an embodiment of the present application further provides a data communication method. Since the device corresponding to this method is the terminal for data communication in embodiments of the present application and the principle of this method to solve the problem is similar to that of this device, the implementations of this method may refer to the implementations of the device, and the repeated description thereof will be omitted here.

Figure 9:
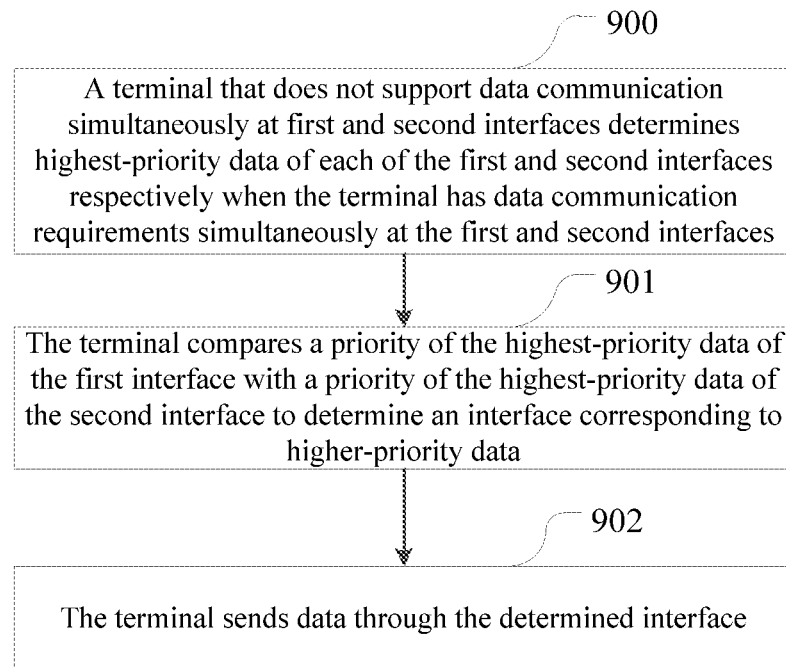
FIG. 9 is a first schematic flowchart of a data communication method according to an embodiment of the present application.

As shown in FIG. 9, it is a schematic flowchart of a data communication method according to an embodiment of the present application, including the following steps.

Step 900: a terminal that does not support data communication simultaneously at first and second interfaces determines highest-priority data of each of the first and second interfaces respectively when the terminal has data communication requirements simultaneously at the first and second interfaces.

Step 901: the terminal compares a priority of the highest-priority data of the first interface with a priority of the highest-priority data of the second interface to determine an interface corresponding to higher-priority data.

Step 902: the terminal sends data through the determined interface.

Optionally, when the highest-priority data of the first interface and the highest-priority data of the second interface are different types of data, the step in which the terminal compares the priority of the highest-priority data of the first interface with the priority of the highest-priority data of the second interface to determine the interface corresponding to higher-priority data includes: the terminal determines the interface corresponding to higher-priority data in a following priority order; where the priority order is: a priority of data from common control channel and/or MAC CE for carrying important control information is higher than a priority of data from logical channels other than the common control channel and/or physical layer control information; the priority of data from logical channels other than the common control channel and/or physical layer control information is higher than a priority of MAC CE for carrying unimportant control information.

Optionally, when the highest-priority data of the first interface and the highest-priority data of the second interface are a same type of data, the step in which the terminal compares the priority of the highest-priority data of the priority of the highest-priority data of the first interface with the priority of the highest-priority data of the second interface to determine the interface corresponding to higher-priority data includes: the terminal determines the interface corresponding to higher-priority data according to one of network configuration, protocol stipulation, pre-configuration or randomization when the highest-priority data of each of the first and second interfaces determined respectively are both data from common control channel and/or MAC CE for carrying important control information; or the terminal determines the interface corresponding to higher-priority data according to one of network configuration, protocol stipulation, pre-configuration or randomization when the highest-priority data of each of the first and second interfaces determined respectively are both MAC CE for carrying unimportant control information; or the terminal compares a priority parameter of a highest-priority logical channel of the first interface with a priority parameter of a highest-priority logical channel of the second interface to determine the interface corresponding to higher-priority data when the highest-priority data of each of the first and second interfaces determined respectively are both data from logical channels other than the common control channel and/or physical layer control information.

Optionally, the MAC CE for carrying important control information includes some or all of: C-RNTI MAC CE; Configured Grant Confirmation MAC CE; BSR MAC CE other than Padding BSR MAC CE; PHR MAC CE, including but not limited to: Single Entry PHR MAC CE or Multiple Entry PHR MAC CE.

Optionally, the MAC CE for carrying unimportant control information includes some or all of: Recommended bit rate query MAC CE; Padding BSR MAC CE; Sidelink BSR MAC CE.

Optionally, when the highest-priority data is physical layer control information, the highest-priority logical channel is one of: the highest-priority logical channel is a logical channel triggering an SR when the physical layer control information is the SR; the highest-priority logical channel is a highest-priority logical channel contained in a TB corresponding to an HARQ feedback when the physical layer control information is the HARQ feedback; the highest-priority logical channel is a highest-priority logical channel on which the terminal currently has data to be sent when the physical layer control information is CSI.

Optionally, the priority parameter of the logical channel includes some or all of: a priority level in a QoS parameter; a priority parameter in RLC channel configuration information.

Optionally, the step in which the terminal compares the priority parameter of the highest-priority logical channel of the first interface with the priority parameter of the highest-priority logical channel of the second interface to determine the interface corresponding to higher-priority data, includes: mapping the priority parameter of the highest-priority logical channel of the first interface to a priority parameter of a logical channel of the second interface, and comparing the priority parameter of the highest-priority logical channel of the first interface with the priority parameter of the highest-priority logical channel of the second interface to determine the interface corresponding to higher-priority data; or mapping the priority parameter of the highest-priority logical channel of the second interface to a priority parameter of a logical channel of the first interface, and comparing the priority parameter of the highest-priority logical channel of the first interface with the priority parameter of the highest-priority logical channel of the second interface to determine the interface corresponding to higher-priority data; or comparing the priority parameter of the highest-priority logical channel of the first interface with a first preset threshold, and determining the interface corresponding to higher-priority data to be the first interface when a value of the priority parameter is lower than the first preset threshold; or comparing the priority parameter of the highest-priority logical channel of the second interface with a second preset threshold, and determining the interface corresponding to higher-priority data to be the second interface when a value of the priority parameter is lower than the second preset threshold; or comparing the priority parameter of the highest-priority logical channel of the first interface directly with the priority parameter of the highest-priority logical channel of the second interface to determine the interface corresponding to higher-priority data.

Optionally, the priority parameter of the logical channel is a priority parameter in RLC channel configuration information; the mapping the priority parameter of the highest-priority logical channel of the second interface to the priority parameter of the logical channel of the first interface, includes: the terminal receives a priority parameter of the first interface in RLC channel configuration information corresponding to the highest-priority logical channel of the second interface configured by a network side device, and uses the priority parameter of the first interface as the mapped priority parameter of the highest-priority logical channel of the second interface; or the mapping the priority parameter of the highest-priority logical channel of the first interface to the priority parameter of the logical channel of the second interface, includes: the terminal receives a priority parameter of the second interface in RLC channel configuration information corresponding to the highest-priority logical channel of the first interface configured by the network side device, and uses the priority parameter of the second interface as the mapped priority parameter of the highest-priority logical channel of the first interface.

Optionally, the priority parameter of the logical channel is a priority level in a QoS parameter; the mapping the priority parameter of the highest-priority logical channel of the second interface to the priority parameter of the logical channel of the first interface, includes: the terminal receives a priority level in a QoS parameter of the first interface in RLC channel configuration information corresponding to the highest-priority logical channel of the second interface configured by a network side device, and uses the priority level in the QoS parameter of the first interface as the mapped priority parameter of the highest-priority logical channel of the second interface; or the mapping the priority parameter of the highest-priority logical channel of the first interface to the priority parameter of the logical channel of the second interface, includes: the terminal receives a priority level in a QoS parameter of the second interface in RLC channel configuration information corresponding to the highest-priority logical channel of the first interface configured by a network side device, and uses the priority level in the QoS parameter of the second interface as the mapped priority parameter of the highest-priority logical channel of the first interface.

Optionally, mapping the priority parameter of the highest-priority logical channel of the second interface to the priority parameter of the logical channel of the first interface, includes: the terminal maps the priority parameter of the highest-priority logical channel of the second interface according to a first mapping relationship between priority parameters of logical channels of the second interface and priority parameters of logical channels of the first interface to obtain the mapped priority parameter of the logical channel of the first interface, and uses the mapped priority parameter as the priority parameter of the highest-priority logical channel of the second interface; or the mapping the priority parameter of the highest-priority logical channel of the first interface to the priority parameter of the logical channel of the second interface, includes: the terminal maps the priority parameter of the highest-priority logical channel of the first interface according to a second mapping relationship between priority parameters of logical channels of the first interface and priority parameters of logical channels of the second interface to obtain the mapped priority parameter of the logical channel of the second interface, and uses the mapped priority parameter as the priority parameter of the highest-priority logical channel of the first interface.

Optionally, the first interface is a direct communication interface, the second interface is a Uu interface, and the priority parameter of the logical channel is a priority level in a QoS parameter; the mapping the priority parameter of the highest-priority logical channel of the second interface to the priority parameter of the logical channel of the first interface, includes: the terminal receives a priority level in a QoS parameter corresponding to the highest-priority logical channel of the second interface configured by a network side, maps the priority level in the QoS parameter of the second interface to a priority level in a QoS parameter of the first interface according to the first mapping relationship, and uses the priority level in the QoS parameter of the first interface as the mapped priority parameter of the highest-priority logical channel of the second interface; or the mapping the priority parameter of the highest-priority logical channel of the first interface to the priority parameter of the logical channel of the second interface, includes: the terminal maps a priority level in a QoS parameter of the first interface to a priority level in a QoS parameter of the second interface according to the second mapping relationship, and uses the priority level in the QoS parameter of the second interface as the mapped priority parameter of the highest-priority logical channel of the first interface.

Optionally, the first interface is a Uu interface, the second interface is a direct communication interface, and the priority parameter of the logical channel is a priority level in a QoS parameter; the mapping the priority parameter of the highest-priority logical channel of the second interface to the priority parameter of the logical channel of the first interface, includes: the terminal maps a priority level in a QoS parameter of the second interface to a priority level in a QoS parameter of the first interface according to the first mapping relationship, and uses the priority level in the QoS parameter of the first interface as the mapped priority parameter of the highest-priority logical channel of the second interface; or the mapping the priority parameter of the highest-priority logical channel of the first interface to the priority parameter of the logical channel of the second interface, includes: the terminal receives a priority level in a QoS parameter corresponding to the highest-priority logical channel of the first interface configured by a network side, maps the priority level in the QoS parameter of the first interface to a priority level in a QoS parameter of the second interface according to the second mapping relationship, and uses the priority level in the QoS parameter of the second interface as the mapped priority parameter of the highest-priority logical channel of the first interface.

Optionally, the priority parameter of the logical channel is a priority parameter in RLC channel configuration information; the mapping the priority parameter of the highest-priority logical channel of the second interface to the priority parameter of the logical channel of the first interface, includes: the terminal maps a priority parameter in RLC channel configuration information of the second interface to a priority parameter in RLC channel configuration information of the first interface according to the first mapping relationship, and uses the priority parameter in the RLC channel configuration information of the first interface as the mapped priority parameter of the highest-priority logical channel of the second interface; or the mapping the priority parameter of the highest-priority logical channel of the first interface to the priority parameter of the logical channel of the second interface, includes: the terminal maps a priority parameter in RLC channel configuration information of the first interface to a priority parameter in RLC channel configuration information of the second interface according to the second mapping relationship, and uses the priority parameter in the RLC channel configuration information of the second interface as the mapped priority parameter of the highest-priority logical channel of the first interface.

Optionally, the terminal determines the first mapping relationship by: the terminal determines the first mapping relationship through some or all of broadcast of the network side device, dedicated signaling of the network side device, protocol agreement or pre-configuration; and/or the terminal determines the second mapping relationship by: the terminal determines the second mapping relationship through some or all of broadcast of the network side device, dedicated signaling of the network side device, protocol agreement or pre-configuration.

Optionally, when the first interface is a direct communication interface, the second interface is a Uu interface; or when the first interface is a Uu interface, the second interface is a direct communication interface.

Based on the same inventive concept, an embodiment of the present application further provides another data communication method. Since the device corresponding to this method is the network side device for data communication in embodiments of the present application and the principle of this method to solve the problem is similar to that of this device, the implementations of this method may refer to the implementations of the device, and the repeated description thereof will be omitted here.

Figure 10:
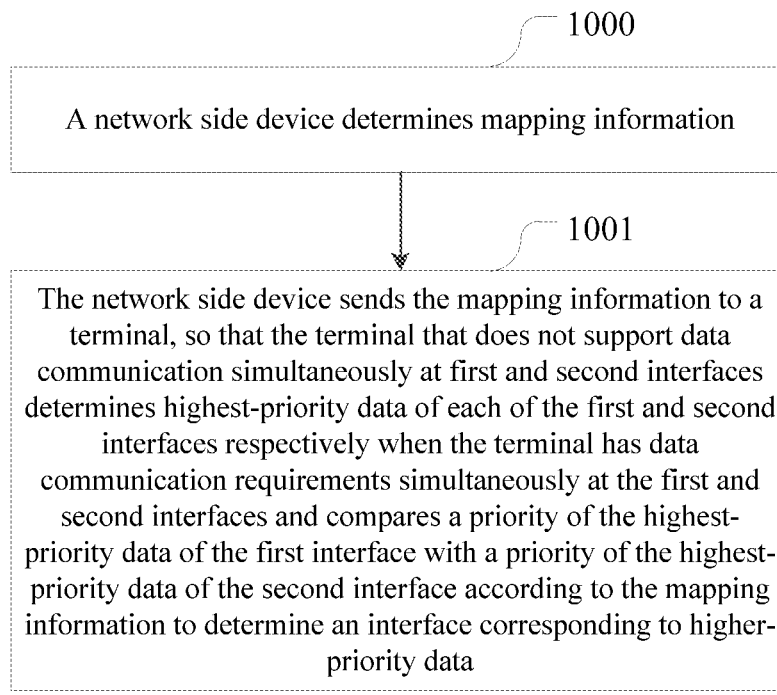
FIG. 10 is a second schematic flowchart of a data communication method according to an embodiment of the present application.

As shown in FIG. 10, it is a schematic flowchart of a data communication method according to an embodiment of the present application, including the following steps.

Step 1000: a network side device determines mapping information.

Step 1001: the network side device sends the mapping information to a terminal, so that the terminal that does not support data communication simultaneously at first and second interfaces determines highest-priority data of each of the first and second interfaces respectively when the terminal has data communication requirements simultaneously at the first and second interfaces and compares a priority of the highest-priority data of the first interface with a priority of the highest-priority data of the second interface according to the mapping information to determine an interface corresponding to higher-priority data.

Optionally, the mapping information includes some or all of: indicating a priority parameter of the first interface corresponding to a highest-priority logical channel of the second interface in RLC channel configuration information corresponding to the logical channel; indicating a priority parameter of the second interface corresponding to a highest-priority logical channel of the first interface in RLC channel configuration information corresponding to the logical channel; indicating a priority level of a QoS parameter of the first interface corresponding to the highest-priority logical channel of the second interface in RLC channel configuration information corresponding to the logical channel; indicating a priority level of a QoS parameter of the second interface corresponding to the highest-priority logical channel of the first interface in RLC channel configuration information corresponding to the logical channel; a first mapping relationship between priority parameters of logical channels of the second interface and priority parameters of logical channels of the first interface; a second mapping relationship between priority parameters of logical channels of the first interface and priority parameters of logical channels of the second interface.

Optionally, when the mapping information includes the first mapping relationship, the step in which the network side device sends the mapping information to the terminal, includes: the network side device sends the first mapping relationship to the terminal through broadcast or dedicated signaling; and/or when the mapping information includes the second mapping relationship, the step in which the network side device sends the mapping information to the terminal, includes: the network side device sends the second mapping relationship to the terminal through broadcast or dedicated signaling.

Optionally, when the first interface is a direct communication interface, the second interface is a Uu interface; or when the first interface is a Uu interface, the second interface is a direct communication interface.

The present application has been described above by reference to the block diagrams and/or flow charts showing the methods, devices (systems) and/or computer program products according to embodiments of the present application. It should be understood that one block shown in the block diagrams and/or flow charts and a combination of the blocks shown in the block diagrams and/or flow charts may be implemented by the computer program instructions. These computer program instructions may be provided to a general-purpose computer, a processor of a dedicated computer and/or another programmable data processing unit to produce a machine, so that the instructions executed by the computer processor and/or another programmable data processing unit create the methods for implementing the functions and/or actions specified in the blocks of the block diagrams and/or flow charts.

Accordingly, the present application may also be implemented by the hardware and/or software (including the firmware, resident software, microcode and the like). Further, the present application may adopt the form of computer program products on the computer usable or computer readable storage medium, which has the computer usable or computer readable program codes implemented in the medium, to be used by the instruction execution system or used in combination with the instruction execution system. In the context of the present application, the computer usable or computer readable storage medium may be any medium, which may contain, store, communicate with, transmit or transfer the programs, to be used by the instruction execution system, apparatus or device, or used in combination with the instruction execution system, apparatus or device.

Evidently those skilled in the art may make various modifications and variations to the present application without departing from the spirit and scope of the present application. Thus the present application is also intended to encompass these modifications and variations therein as long as these modifications and variations to the present application come into the scope of the claims of the present application and their equivalents.

What is claimed is:

1. A data communication method, comprising:
determining, by a terminal that does not support data communication simultaneously at first and second interfaces, highest-priority data of each of the first and second interfaces respectively when the terminal has data communication requirements simultaneously at the first and second interfaces;
comparing, by the terminal, a priority of the highest-priority data of the first interface with a priority of the highest-priority data of the second interface to determine an interface corresponding to higher-priority data;
sending, by the terminal, data through the determined interface;
wherein, when the highest-priority data of the first interface and the highest-priority data of the second interface are a same type of data, comparing, by the terminal, the priority of the highest-priority data of the first interface with the priority of the highest-priority data of the second interface to determine the interface corresponding to the higher-priority data, comprises:
determining, by the terminal, the interface corresponding to the higher-priority data according to one of network configuration, protocol stipulation, pre-configuration or randomization when the highest-priority data of each of the first and second interfaces determined respectively are both data from common control channel and/or MAC CE for carrying important control information; or
determining, by the terminal, the interface corresponding to the higher-priority data according to one of network configuration, protocol stipulation, pre-configuration or randomization when the highest-priority data of each of the first and second interfaces determined respectively are both MAC CE for carrying unimportant control information; or
comparing, by the terminal, a priority parameter of a highest-priority logical channel of the first interface with a priority parameter of a highest-priority logical channel of the second interface to determine the interface corresponding to the higher-priority data when the highest-priority data of each of the first and second interfaces determined respectively are both data from logical channels other than the common control channel and/or physical layer control information.

2. The method according to claim 1, wherein, when the highest-priority data of the first interface and the highest-priority data of the second interface are different types of data, comparing, by the terminal, the priority of the highest-priority data of the first interface with the priority of the highest-priority data of the second interface to determine the interface corresponding to the higher-priority data, comprises:
determining, by the terminal, the interface corresponding to the higher-priority data in a following priority order;
wherein the priority order is:
a priority of data from common control channel and/or Medium Access Control Control Element, MAC CE, for carrying important control information is higher than a priority of data from logical channels other than the common control channel and/or physical layer control information; and/or
the priority of data from logical channels other than the common control channel and/or physical layer control information is higher than a priority of MAC CE for carrying unimportant control information.

3. The method according to claim 2, wherein the MAC CE for carrying important control information comprises some or all of:
Cell Radio Network Temporary Identity, C-RNTI, MAC CE;
Configured Grant Confirmation MAC CE;
Buffer Status Report, BSR, MAC CE other than Padding BSR MAC CE;

Power Headroom Report, PHR, MAC CE, comprising but not limited to: Single Entry PHR MAC CE or Multiple Entry PHR MAC CE;

the MAC CE for carrying unimportant control information comprises some or all of:

Recommended bit rate query MAC CE;

Padding BSR MAC CE;

Sidelink BSR MAC CE.

4. The method according to claim 1, wherein, when the highest-priority data is physical layer control information, the highest-priority logical channel is one of:

the highest-priority logical channel is a logical channel triggering a Scheduling Request, SR, when the physical layer control information is the SR; and/or the highest-priority logical channel is a highest-priority logical channel contained in a Transport Block, TB, corresponding to a Hybrid Automatic Repeat reQuest, HARQ, feedback when the physical layer control information is the HARQ feedback; and/or the highest-priority logical channel is a highest-priority logical channel on which the terminal currently has data to be sent when the physical layer control information is Channel State Information, CSI;

wherein the priority parameter of the logical channel comprises some or all of:

a priority level in a Quality of Service, QoS, parameter;

a priority parameter in Radio Link Control, RLC, channel configuration information.

5. The method according to claim 4, wherein comparing, by the terminal, the priority parameter of the highest-priority logical channel of the first interface with the priority parameter of the highest-priority logical channel of the second interface to determine the interface corresponding to the higher-priority data, comprises at least one of or any combination of:

mapping the priority parameter of the highest-priority logical channel of the first interface to a priority parameter of a logical channel of the second interface, and comparing the priority parameter of the highest-priority logical channel of the first interface with the priority parameter of the highest-priority logical channel of the second interface to determine the interface corresponding to the higher-priority data; or mapping the priority parameter of the highest-priority logical channel of the second interface to a priority parameter of a logical channel of the first interface, and comparing the priority parameter of the highest-priority logical channel of the first interface with the priority parameter of the highest-priority logical channel of the second interface to determine the interface corresponding to the higher-priority data; or comparing the priority parameter of the highest-priority logical channel of the first interface with a first preset threshold, and determining the interface corresponding to the higher-priority data to be the first interface when a value of the priority parameter is lower than the first preset threshold; or comparing the priority parameter of the highest-priority logical channel of the second interface with a second preset threshold, and determining the interface corresponding to the higher-priority data to be the second interface when a value of the priority parameter is lower than the second preset threshold; or comparing the priority parameter of the highest-priority logical channel of the first interface directly with the priority parameter of the highest-priority logical channel of the second interface to determine the interface corresponding to the higher-priority data.

6. The method according to claim 5, wherein the priority parameter of the logical channel is a priority parameter in RLC channel configuration information;

mapping the priority parameter of the highest-priority logical channel of the second interface to the priority parameter of the logical channel of the first interface, comprises:

receiving, by the terminal, a priority parameter of the first interface in RLC channel configuration information corresponding to the highest-priority logical channel of the second interface configured by a network side device, and using the priority parameter of the first interface as the mapped priority parameter of the highest-priority logical channel of the second interface; or mapping the priority parameter of the highest-priority logical channel of the first interface to the priority parameter of the logical channel of the second interface, comprises:

receiving, by the terminal, a priority parameter of the second interface in RLC channel configuration information corresponding to the highest-priority logical channel of the first interface configured by the network side device, and using the priority parameter of the second interface as the mapped priority parameter of the highest-priority logical channel of the first interface.

7. The method according to claim 5, wherein the priority parameter of the logical channel is a priority level in a QoS parameter;

mapping the priority parameter of the highest-priority logical channel of the second interface to the priority parameter of the logical channel of the first interface, comprises:

receiving, by the terminal, a priority level in a QoS parameter of the first interface in RLC channel configuration information corresponding to the highest-priority logical channel of the second interface configured by a network side device, and using the priority level in the QoS parameter of the first interface as the mapped priority parameter of the highest-priority logical channel of the second interface; or mapping the priority parameter of the highest-priority logical channel of the first interface to the priority parameter of the logical channel of the second interface, comprises:

receiving, by the terminal, a priority level in a QoS parameter of the second interface in RLC channel configuration information corresponding to the highest-priority logical channel of the first interface configured by the network side device, and using the priority level in the QoS parameter of the second interface as the mapped priority parameter of the highest-priority logical channel of the first interface.

8. The method according to claim 5, wherein mapping the priority parameter of the highest-priority logical channel of the second interface to the priority parameter of the logical channel of the first interface, comprises:

mapping, by the terminal, the priority parameter of the highest-priority logical channel of the second interface according to a first mapping relationship between priority parameters of logical channels of the second interface and priority parameters of logical channels of the first interface to obtain the mapped priority parameter of the logical channel of the first interface, and using the mapped priority parameter as the priority parameter of the highest-priority logical channel of the second interface; or mapping the priority parameter of the highest-priority logical channel of the first interface to the priority parameter of the logical channel of the second interface, comprises:

mapping, by the terminal, the priority parameter of the highest-priority logical channel of the first interface according to a second mapping relationship between priority parameters of logical channels of the first interface and priority parameters of logical channels of the second interface to obtain the mapped priority parameter of the logical channel of the second interface, and using the mapped priority parameter as the priority parameter of the highest-priority logical channel of the first interface.

9. The method according to claim 8, wherein the first interface is a direct communication interface, the second interface is a Uu interface, and the priority parameter of the logical channel is a priority level in a QoS parameter;

mapping the priority parameter of the highest-priority logical channel of the second interface to the priority parameter of the logical channel of the first interface, comprises:

receiving, by the terminal, a priority level in a QoS parameter corresponding to the highest-priority logical channel of the second interface configured by a network side, mapping the priority level in the QoS parameter of the second interface to a priority level in a QoS parameter of the first interface according to the first mapping relationship, and using the priority level in the QoS parameter of the first interface as the mapped priority parameter of the highest-priority logical channel of the second interface; or mapping the priority parameter of the highest-priority logical channel of the first interface to the priority parameter of the logical channel of the second interface, comprises:

mapping, by the terminal, a priority level in a QoS parameter of the first interface to a priority level in a QoS parameter of the second interface according to the second mapping relationship, and using the priority level in the QoS parameter of the second interface as the mapped priority parameter of the highest-priority logical channel of the first interface.

10. The method according to claim 8, wherein the first interface is a Uu interface, the second interface is a direct communication interface, and the priority parameter of the logical channel is a priority level in a QoS parameter;

mapping the priority parameter of the highest-priority logical channel of the second interface to the priority parameter of the logical channel of the first interface, comprises:

mapping, by the terminal, a priority level in a QoS parameter of the second interface to a priority level in a QoS parameter of the first interface according to the first mapping relationship, and using the priority level in the QoS parameter of the first interface as the mapped priority parameter of the highest-priority logical channel of the second interface; or mapping the priority parameter of the highest-priority logical channel of the first interface to the priority parameter of the logical channel of the second interface, comprises:

receiving, by the terminal, a priority level in a QoS parameter corresponding to the highest-priority logical channel of the first interface configured by a network side, mapping the priority level in the QoS parameter of the first interface to a priority level in the QoS parameter of the second interface according to the second mapping relationship, and using the priority level in the QoS parameter of the second interface as the mapped priority parameter of the highest-priority logical channel of the first interface.

11. The method according to claim 8, wherein the priority parameter of the logical channel is a priority parameter in RLC channel configuration information;

mapping the priority parameter of the highest-priority logical channel of the second interface to the priority parameter of the logical channel of the first interface, comprises:

mapping, by the terminal, a priority parameter in RLC channel configuration information of the second interface to a priority parameter in RLC channel configuration information of the first interface according to the first mapping relationship, and using the priority parameter in the RLC channel configuration information of the first interface as the mapped priority parameter of the highest-priority logical channel of the second interface; or mapping the priority parameter of the highest-priority logical channel of the first interface to the priority parameter of the logical channel of the second interface, comprises:

mapping, by the terminal, a priority parameter in RLC channel configuration information of the first interface to a priority parameter in RLC channel configuration information of the second interface according to the second mapping relationship, and using the priority parameter in the RLC channel configuration information of the second interface as the mapped priority parameter of the highest-priority logical channel of the first interface.

12. The method according to claim 8, wherein the terminal determines the first mapping relationship by:

determining, by the terminal, the first mapping relationship through some or all of broadcast of the network side device, dedicated signaling of the network side device, protocol agreement or pre-configuration; and/or the terminal determines the second mapping relationship by:

determining, by the terminal, the second mapping relationship through some or all of broadcast of the network side device, dedicated signaling of the network side device, protocol agreement or pre-configuration.

13. The method according to claim 1, wherein, when the first interface is a direct communication interface, the second interface is a Uu interface; or when the first interface is a Uu interface, the second interface is a direct communication interface.

14. A data communication method, comprising:

determining, by a network side device, mapping information;

sending, by the network side device, the mapping information to a terminal, so that the terminal that does not support data communication simultaneously at first and second interfaces determines highest-priority data of each of the first and second interfaces respectively when the terminal has data communication requirements simultaneously at the first and second interfaces and compares a priority of the highest-priority data of the first interface with a priority of the highest-priority data of the second interface to determine an interface corresponding to higher-priority data;

wherein, when the highest-priority data of the first interface and the highest-priority data of the second interface are a same type of data, comparing, by the terminal, the priority of the highest-priority data of the first interface with the priority of the highest-priority data of the second interface to determine the interface corresponding to the higher-priority data, comprises:

determining, by the terminal, the interface corresponding to the higher-priority data according to one of network configuration, protocol stipulation, pre-configuration or randomization when the highest-priority data of each of the first and second interfaces determined respectively are both data from common control channel and/or MAC CE for carrying important control information; or determining, by the terminal, the interface corresponding to the higher-priority data according to one of network configuration, protocol stipulation, pre-configuration or randomization when the highest-priority data of each of the first and second interfaces determined respectively are both MAC CE for carrying unimportant control information; or comparing, by the terminal, a priority parameter of a highest-priority logical channel of the first interface with a priority parameter of a highest-priority logical channel of the second interface to determine the interface corresponding to the higher-priority data when the highest-priority data of each of the first and second interfaces determined respectively are both data from logical channels other than the common control channel and/or physical layer control information.

15. The method according to claim 14, wherein the mapping information comprises some or all of:

indicating a priority parameter of the first interface corresponding to a highest-priority logical channel of the second interface in RLC channel configuration information corresponding to the logical channel;

indicating a priority parameter of the second interface corresponding to a highest-priority logical channel of the first interface in RLC channel configuration information corresponding to the logical channel;

indicating a priority level of a QoS parameter of the first interface corresponding to the highest-priority logical channel of the second interface in RLC channel configuration information corresponding to the logical channel;

indicating a priority level of a QoS parameter of the second interface corresponding to the highest-priority logical channel of the first interface in RLC channel configuration information corresponding to the logical channel;

a first mapping relationship between priority parameters of logical channels of the second interface and priority parameters of logical channels of the first interface;

a second mapping relationship between priority parameters of logical channels of the first interface and priority parameters of logical channels of the second interface.

16. The method according to claim 15, wherein, when mapping information comprises the first mapping relationship, sending, by the network side device, the mapping information to the terminal, comprises:

sending, by the network side device, the first mapping relationship to the terminal through broadcast or dedicated signaling; and/or when mapping information comprises the second mapping relationship, sending, by the network side device, the mapping information to the terminal, comprises:

sending, by the network side device, the second mapping relationship to the terminal through broadcast or dedicated signaling.

17. The method according to claim 14, wherein, when the first interface is a direct communication interface, the second interface is a Uu interface; or when the first interface is a Uu interface, the second interface is a direct communication interface.

18. A network side device for data communication, the network side device comprising: a processor, a memory and a transceiver;

wherein the processor is configured to read a program in the memory and perform:

determining mapping information; and sending the mapping information to a terminal, so that the terminal that does not support data communication simultaneously at first and second interfaces determines highest-priority data of each of the first and second interfaces respectively when the terminal has data communication requirements simultaneously at the first and second interfaces and compares a priority of the highest-priority data of the first interface with a priority of the highest-priority data of the second interface according to the mapping information to determine an interface corresponding to higher-priority data;

wherein, when the highest-priority data of the first interface and the highest-priority data of the second interface are a same type of data, comparing, by the terminal, the priority of the highest-priority data of the first interface with the priority of the highest-priority data of the second interface to determine the interface corresponding to the higher-priority data, comprises:

determining, by the terminal, the interface corresponding to higher-priority data according to one of network configuration, protocol stipulation, pre-configuration or randomization when the highest-priority data of each of the first and second interfaces determined respectively are both data from common control channel and/or MAC CE for carrying important control information; or determining, by the terminal, the interface corresponding to the higher-priority data according to one of network configuration, protocol stipulation, pre-configuration or randomization when the highest-priority data of each of the first and second interfaces determined respectively are both MAC CE for carrying unimportant control information; or comparing, by the terminal, a priority parameter of a highest-priority logical channel of the first interface with a priority parameter of a highest-priority logical channel of the second interface to determine the interface corresponding to the higher-priority data when the highest-priority data of each of the first and second interfaces determined respectively are both data from logical channels other than the common control channel and/or physical layer control information.

19. A terminal for data communication, the terminal being a terminal that does not support data communication simultaneously at first and second interfaces, and the terminal comprising: a processor, a memory and a transceiver;

wherein the processor is configured to read a program in the memory and perform:

determining highest-priority data of each of the first and second interfaces respectively when there are data communication requirements simultaneously at the first and second interfaces;

comparing a priority of the highest-priority data of the first interface with a priority of the highest-priority data of the second interface to determine an interface corresponding to higher-priority data;

sending data through the determined interface;

wherein, when the highest-priority data of the first interface and the highest-priority data of the second interface are a same type of data, the processor is configured to perform:

determining the interface corresponding to the higher-priority data according to one of network configuration, protocol stipulation, pre-configuration or randomization when the highest-priority data of each of the first and second interfaces determined respectively are both data from common control channel and/or MAC CE for carrying important control information; or determining the interface corresponding to the higher-priority data according to one of network configuration, protocol stipulation, pre-configuration or randomization when the highest-priority data of each of the first and second interfaces determined respectively are both MAC CE for carrying unimportant control information; or comparing a priority parameter of a highest-priority logical channel of the first interface with a priority parameter of a highest-priority logical channel of the second interface to determine the interface corresponding to the higher-priority data when the highest-priority data of each of the first and second interfaces determined respectively are both data from logical channels other than the common control channel and/or physical layer control information.

* * * * *